United States Patent
Park et al.

(10) Patent No.: US 8,711,187 B2
(45) Date of Patent: Apr. 29, 2014

(54) PICTURE QUALITY CONTROL METHOD AND IMAGE DISPLAY USING SAME

(75) Inventors: Sung-Jin Park, Seoul (KR); Mun-Sik Bae, Seoul (KR); Il-Gun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 13/122,284

(22) PCT Filed: Oct. 1, 2009

(86) PCT No.: PCT/KR2009/005652
§ 371 (c)(1),
(2), (4) Date: Jun. 6, 2011

(87) PCT Pub. No.: WO2010/039005
PCT Pub. Date: Apr. 8, 2010

(65) Prior Publication Data
US 2011/0234654 A1     Sep. 29, 2011

(30) Foreign Application Priority Data
Oct. 2, 2008   (KR) .................. 10-2008-0097075

(51) Int. Cl.
*G09G 5/10*   (2006.01)
(52) U.S. Cl.
USPC ............ 345/690; 345/20; 345/204; 345/549; 345/581; 345/589; 345/593; 345/594
(58) Field of Classification Search
USPC .......... 345/20, 204, 549, 581, 589, 593, 594, 345/690
See application file for complete search history.

(56) References Cited

U.S. PATENT DOCUMENTS

| | | | |
|---|---|---|---|
| 4,694,298 A * | 9/1987 | Milan | 342/89 |
| 5,844,542 A * | 12/1998 | Inoue et al. | 345/594 |
| 5,923,315 A * | 7/1999 | Ueda et al. | 345/581 |
| 6,084,564 A * | 7/2000 | Ohara et al. | 345/20 |
| 6,683,616 B1 | 1/2004 | Yamauchi et al. | 345/589 |
| 7,602,991 B2 * | 10/2009 | Kokemohr | 382/260 |
| 2002/0093518 A1 | 7/2002 | Nakano | 345/643 |
| 2005/0093886 A1* | 5/2005 | Kubota | 345/619 |
| 2006/0132867 A1* | 6/2006 | Sugiyama et al. | 358/504 |
| 2006/0203004 A1 | 9/2006 | Hwang et al. | |

(Continued)

FOREIGN PATENT DOCUMENTS

| | | |
|---|---|---|
| CN | 1307318 A | 8/2001 |
| EP | 1 069 764 A2 | 1/2001 |

(Continued)

OTHER PUBLICATIONS

European Search Report dated Mar. 26, 2012 issued in Application No. 09 81 8015.

(Continued)

*Primary Examiner* — Xiao M. Wu
*Assistant Examiner* — Todd Buttram
(74) *Attorney, Agent, or Firm* — KED & Associates, LLP

(57) ABSTRACT

A definition control method and an image display device using the same are provided. The definition control method includes displaying a first pattern and a second pattern, inputting a control value, and changing a display state of the first pattern according to the input control value, wherein a display state of the second pattern is not changed by the control value.

59 Claims, 17 Drawing Sheets

(56) References Cited

U.S. PATENT DOCUMENTS

| | | | |
|---|---|---|---|
| 2006/0284898 A1* | 12/2006 | Shen et al. | 345/690 |
| 2007/0236243 A1 | 10/2007 | Park et al. | |
| 2008/0266294 A1* | 10/2008 | Osman | 345/426 |

FOREIGN PATENT DOCUMENTS

| | | |
|---|---|---|
| EP | 1 655 951 A1 | 5/2006 |
| EP | 2 053 591 A1 | 4/2009 |
| JP | 2001-268475 A | 9/2001 |
| JP | 2008-147931 A | 6/2008 |
| KR | 10-2006-0084603 | 7/2006 |
| KR | 10-2007-0044319 | 4/2007 |
| WO | WO 2008/016149 A1 | 2/2008 |

OTHER PUBLICATIONS

Chinese Office Action dated Feb. 5, 2013 issued in Application No. 200980144387.5 (English translation only).

International Search Report issued in PCT Application No. PCT/KR2009/005652 dated Apr. 5, 2010.

European Office Action dated Apr. 17, 2013 issued in Application No. 09 818 015.1.

* cited by examiner

PICTURE QUALITY CONTROL METHOD AND IMAGE DISPLAY USING SAME

CROSS-REFERENCE TO RELATED APPLICATIONS

The present application claims priority under 35 U.S.C. 119 and 35 U.S.C. 365 to Korean Patent Application No. 10-2008-0097075 filed on Oct. 2, 2008, which is hereby incorporated by reference in its entirety.

BACKGROUND

The present disclosure relates to a method of controlling the definition of an image display device, and more particularly, to a method of displaying a pattern for controlling definition on a screen of an image display device.

As a type of image display device, televisions (TVs) receive a broadcast signal from a broadcasting station to display an image and output sound corresponding to the broadcast signal. Also, a TV is connected to an external device, for example, a Digital Video Disk (DVD) player, set-top box, or a computer and displays various images.

That is, TVs receive a video signal and an audio signal from an external device to output an image corresponding to the video signal and sound corresponding to the audio signal. Generally, TVs and external devices have a function that changes definition information control definition according to a user's manipulation. Herein, the definition information includes information regarding brightness, a contrast ratio, sharpness, and a color.

Image display devices provide a user interface for controlling brightness, a contrast ratio, definition, and a color such that a user changes the quality of a current image.

However, a user manipulates a control bar for controlling definition, and thus, a lot of repetitive controls are necessarily required for changing to definition a user desires.

As a result, since most users lack a specific knowledge of definition, it is difficult for the users to set desired definition.

SUMMARY

Embodiments provide a definition control method and an image display device using the same, which provide a user that allows a user to easily control definition of the image display device, and allow the user to easily control definition with a plurality of patterns.

In one embodiment, a definition control method of an image display device includes: displaying a first pattern and a second pattern; inputting a control value; and changing a display state of the first pattern according to the input control value, wherein a display state of the second pattern is not changed by the control value.

In another embodiment, a definition control method of an image display device includes: displaying a first pattern and a second pattern; and inputting a control value, wherein a display state of the first pattern is changed to be equal to a display state of the second pattern as the control value changes.

In further another embodiment, a definition control method of an image display device includes: displaying a first pattern and a second pattern; inputting a control value; and displaying a control value display On Screen Display (OSD) for displaying the input control value, the control value display OSD including a variable region and a fixed region, and the variable region being variably displayed according to the input control value, wherein the second pattern includes a plurality of images, and, as the variable region of the control value display OSD is changed in a direction of a first side, a display state of the first pattern is changed to be equal to a display state of an image positioned at the first side among the images included in the second pattern.

In still further another embodiment, an image display device includes: a memory storing a first pattern and a second pattern; a user input unit through which a user inputs a control value; a signal processing unit performing imaging processing upon the first pattern according to the input control value; and a display unit displaying a first pattern input from the signal processing unit, and a second pattern stored in the memory.

In still another embodiment, an image display device having a control menu includes: an image displayed in a first region; a first pattern displayed in a second region; a second pattern displayed in a third region; and a control value display On Screen Display (OSD) displayed in a fourth region, wherein the control value display OSD includes a fixed region and a variable region, the variable region is variably displayed according the input control value and displays a value of a definition element by using a number, a character or an abstract degree, and the image in the first region and the first pattern in the second region are changed according to a change in the control value.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it will be understood that the spirit and scope of the present invention include the addition, deletion and modification of an element for the proposed embodiments.

The meaning of "include," "comprise," "including," or "comprising," specifies a property, a region, a fixed number, a step, a process, an element and/or a component but does not exclude other properties, regions, fixed numbers, steps, processes, elements and/or components.

An image display device according to embodiments may provide a definition control function that allows a user to directly control respective definition items, for example, brightness, contrast, color concentration, tint, sharpness, or backlight brightness.

Figure 1:
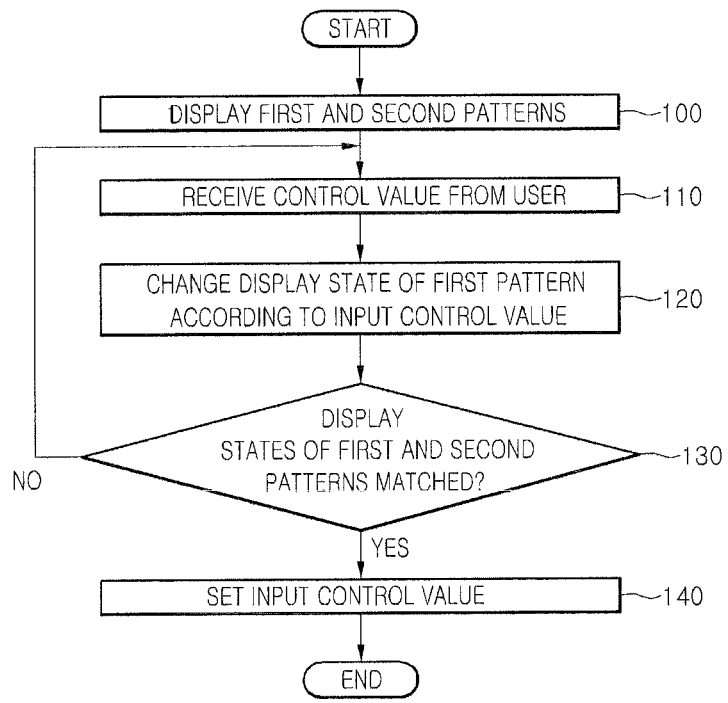
FIG. 1 is a flowchart illustrating a definition control method according to an embodiment.

FIG. 1 is a flowchart illustrating a definition control method according to an embodiment.

Referring to FIG. 1, an image display device displays first and second patterns in operation 100.

The image display device may include a display module for displaying an image. For example, the display module may include a display panel such as a Liquid Crystal Display (LCD), a Plasma Display Panel (PDP), an Electro Luminescence Display (ELD), or a Vacuum Fluorescent Display (ELD).

For example, the image display device may display a video signal, which is inputted from the outside, on a screen with the display module. The image display device may display a screen, which includes the first and second patterns, for controlling definition when controlling definition.

Figure 2:
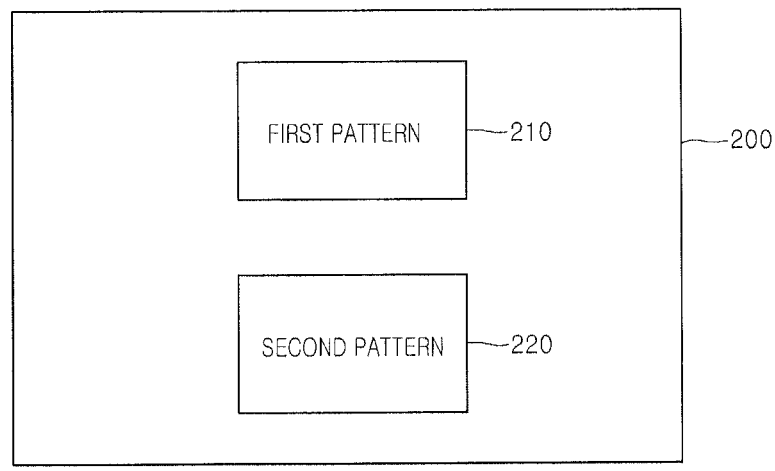
FIG. 2 a diagram illustrating an embodiment of a plurality of patterns which are displayed on a screen of an image display device for controlling definition.

As illustrated in FIG. 2, the first and second patterns may be simultaneously displayed on a display screen 200. For example, the first and second patterns may be adjacently disposed in a vertical direction or a horizontal direction.

The first and second patterns 210 and 220 may be internal patterns of the image display device, i.e., stored in a memory included in the image display device. However, the present invention is not limited thereto. For example, at least one of the first and second patterns 210 and 220 may be inputted from an external pattern generation device.

The image display device receives a control value for definition control from a user in operation 110.

The control value may be a value for controlling definition characteristic corresponding to any one of the definition items, for example, a control value for changing any one of brightness, contrast, color concentration, tint, sharpness, and backlight brightness that are definition items controllable in the image display device.

The image display device changes a display state of the first pattern 210 according to the control value in operation 120.

According to an embodiment, a display state of the second pattern 220 may not be changed according to the control value but displayed in a state where the second pattern 220 is fixed on the display screen 200.

For example, the first and second patterns 210 and 220 may denote video data that are stored in an internal memory of the image display device before image processing for display. A state where the pattern is displayed may denote a state where the first and second patterns 210 and 220 are displayed on a screen for definition control and visually perceived by a user.

For example, the first pattern 210 may be image-processed according to the control value inputted by the user, and a state where the first pattern 210 is displayed on the display screen 200 may be changed with the change in the control value. More specifically, the brightness, contrast, color concentration, tint sharpness or backlight brightness of the first pattern 210 displayed on the screen 200 may be changed.

That is, the display state of the first pattern 210 being changed may denote that definition of the first pattern 210 which is displayed on the screen 200 and visually perceived by the user, in more detail, definition characteristic corresponding to a specific definition item to be controlled is changed.

For example, when brightness being one of the definition items is controlled, brightness of a specific region included in the first pattern 210 or second pattern 220 displayed on the screen 200 may be changed according to the received control value.

Moreover, the first pattern 210 displayed in controlling of definition may differ for each of the definition items.

That is, the brightness, contrast, color concentration, tint, sharpness, backlight brightness, shape or size of the first pattern 210 displayed in controlling of definition may differ for each of the definition items.

The first pattern 210 displayed in definition control of a first item of the definition items and the first pattern 210 displayed in definition control of a second item of the definition items may have different definition states corresponding to the first item.

For example, the first pattern 210 displayed in controlling of brightness and the first pattern 210 displayed in controlling of contrast may have different brightness states.

Moreover, the first pattern 210 displayed in definition control of the first item and the first pattern 210 displayed in definition control of the second item may have the same definition state corresponding to a third item of the definition items.

For example, the first pattern 210 displayed in controlling of brightness and the first pattern 210 displayed in controlling of contrast may have the same color that is displayed on the screen 200.

The display state of the second pattern 220 may not be changed according to the received control value but fixed, for which the second pattern 220 may not undergo an image processing operation that is performed according to the received control value. That is, the brightness, contrast, color concentration, tint, sharpness, or backlight brightness of the second pattern 220 that is displayed on the screen 200 and visually perceived by the user may be maintained irrespective of the received control value.

The second pattern 220 is a criterion pattern in definition control. For example, definition control according to an embodiment allows the display state of the first pattern 210 to be matched with the display state of the second pattern 210.

According to an embodiment, a user allows the display state of the first pattern 210, which is changed according to the received control value, to be matched with the display state of the second pattern 210, and sets a control value at a time when the display state of the first pattern 210 is matched with the display state of the second pattern 210, thereby controlling definition of the image display device.

For this, the second pattern 220 may include an image that is generated to have standard definition. As described above, in order for the second pattern 220 to become a criterion of definition control, an image of the second pattern 220 may not be changed according to the received control value but fixed.

The standard definition may denote definition of the image display device that may display an input video signal as in the original signal, and be definition of an image source itself, for example, definition where the image display device may brightness, contrast, color concentration, tint, sharpness, and entire screen brightness as-is.

The second pattern 220 may be generated to have the above-described standard definition and then stored the internal memory of the image display device. Unlike the first pattern 210 that is changed according to the control value, the second pattern 220 may undergo an image processing operation different from that of the first pattern 210 and then be displayed in order for a display state to be fixed.

The standard definition of the second pattern 220 may be differently set according to a manufacturer and used area of the image display device.

The controllable definition items of the second pattern 220 displayed in controlling of definition may differ.

That is, the brightness, contrast, color concentration, tint, sharpness, backlight brightness or shape of the second pattern 220 displayed in controlling of definition may differ for each of the definition items.

The second pattern 220 displayed in definition control of a first item of the definition items and the second pattern 220 displayed in definition control of a second item of the definition items may have different definition states corresponding to the first item.

For example, the second pattern 220 displayed in controlling of brightness and the second pattern 220 displayed in controlling of contrast may have different brightness states.

Moreover, the second pattern 220 displayed in definition control of the first item and the second pattern 220 displayed in definition control of the second item may have the same definition state corresponding to a third item of the definition items.

For example, the second pattern 220 displayed in controlling of brightness and the second pattern 220 displayed in controlling of contrast may have the same color that is displayed on the screen 200.

Like the above-described, the first and second patterns 210 and 220 being different from each other for each of the definition items will be described below in detail with reference to FIGS. 13 to 38.

The image display device checks whether the display state of the first pattern 210 is matched with the display state of the second pattern 220 in operation 130.

According to an embodiment, as described above, the image display device may display the first and second patterns 210 and 220 on the display screen 200, and allow the user to determine whether the display state of the first pattern 210 is visually matched with the display state of the second pattern 220.

Therefore, the display state of the first pattern 210 being matched with the display state of the second pattern 220 includes a case where the display states of the first and second patterns 210 and 220 on the screen 200 are objectively matched, for example, are accurately matched through a measured result of a definition measurement apparatus, and a case where states where the first and second patterns 210 and 220 are displayed on the screen 200 and visually perceived by the user are matched.

In an embodiment, provided is a definition control method that allows the first pattern 210 to be matched with the second pattern 220 having the standard definition when viewed by a user and thus is adaptive to a user. Accordingly, a time when the display state of the first pattern 210 is matched with the display state of the second pattern 220 may be differently determined according to users.

Therefore, the image display device according to an embodiment allows the user to visually determine whether the display state of the first pattern 210 is matched with the display state of the second pattern 220. When the user determines the display state of the first pattern 210 as being matched with the display state of the second pattern 220, the user may set a control value according to that the display state of the first pattern 210 is matched with the display state of the second pattern 220.

For this, the image display device displays a sentence "set a control value for the display state of the first pattern 210 to be matched with the display state of the second pattern 220" on a screen for definition control, and thus allows the user to set a control value at a time when the display state of the first pattern 210 is visually matched with the display state of the second pattern 220.

When the checked result of operation 130 shows that the display state of the first pattern 210 is not matched with the display state of the second pattern 220, the image display device repeats operations 110 and 120 until the display state of the first pattern 210 is matched with the display state of the second pattern 220.

When the display state of the first pattern 210 is matched with the display state of the second pattern 220, the image display device sets the received control value in operation 140.

That is, when the user determines the display state of the first pattern 210 as being matched with the display state of the second pattern 220 visually and performs an input corresponding thereto, the image display device sets a first value inputted at a corresponding time as a control value, thereby performing definition control.

Figure 3:
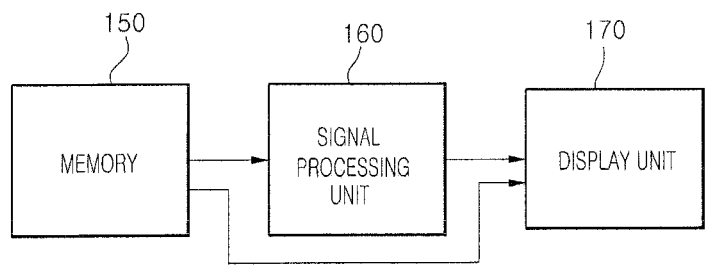
FIG. 3 is a block diagram illustrating a configuration of an image display device according to an embodiment.

FIG. 3 is a block diagram illustrating a configuration of an image display device according to an embodiment. An image display device according to an embodiment may include a memory 150, a signal processing unit 160, and a display unit 170.

Referring to FIG. 3, the memory 150 includes the first and second patterns 210 and 220 that are as described above. According to another embodiment, one of the first and second patterns 210 and 220 may not be stored in the memory 150 but inputted from the outside. For example, the memory 150 may be a flash Read-Only Memory (ROM) or a nonvolatile memory.

Moreover, the first and second patterns 210 and 220 may be generated as video signals having different formats and stored in the memory 150. For example, the first pattern 210 may be a video signal that is compressed according to a video coding scheme, specifically, a Moving Picture Experts Group (MPEG) coding scheme, but the second pattern 220 may be RGB video signals that are not compressed.

The signal processing unit 160 image-processes and outputs the first pattern 210 according to an input control value, for which the image display device may include a user input unit (not shown) for receiving the control value from a user. For example, the user input unit (not shown) may be a plurality of input buttons included in the image display device or an external remote controller.

The display unit 170 displays the input first and second patterns 210 and 220 on the screen 200.

The first and second patterns 210 and 220 may undergo different image processing operations before being displayed on the display unit 170.

For example, the second pattern 220 stored in the memory 150 may be inputted to the display unit 170 without passing through the signal processing unit 160. Therefore, as described above, a state where the second pattern 220 is displayed on the display unit 170 may not be changed by the input control value, but the second pattern 220 may be displayed in definition of a video signal stored in the memory 150, for example, standard definition.

That is, the first pattern 210 passes through the signal processing unit 160 that performs image processing to change definition according to the input control value, and thus a state where the first pattern 210 is displayed on the display unit 170 is changed according to the input control value. On the other hand, the second pattern 220 bypasses the signal processing unit 160, and thus a state where the second pattern 220 is displayed on the display unit 170 may not be changed according to the input control value.

In FIG. 3, various kinds of image receivers for receiving a video signal from the outside is not illustrated, but the image display device may include input terminals such as Composite Video Baseband Signal (CVBS), S-Video, Component, PC-Signal, Digital Video/visual Interactive (DVI), and High-Definition Multimedia Interface (HDMI).

In FIG. 3, it is illustrated that the second pattern 220 stored in the memory 150 does not undergo a separate processing operation but is directly inputted to the display unit 170. To the contrary, the second pattern 220 stored in the memory 150 may undergo a separate processing operation and be directly inputted to the display unit 170.

A processing operation performed on the second pattern 220 is performed regardless of the input control value, and the second pattern 220 bypasses a function block that performs image processing based on the control value, even in which case the display state of the second pattern 220 may not be changed according to the control value.

To display the first and second patterns 210 and 220, moreover, the display unit 170 may include a display module including a display panel such as an LCD, a PDP, an ELD, or a VFD.

Figure 4:
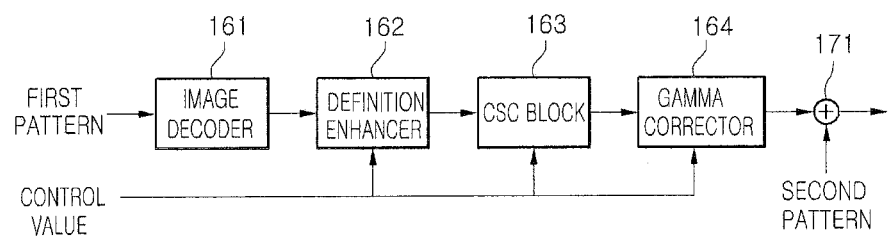
FIG. 4 is a block diagram illustrating an embodiment of a signal processing unit of FIG. 3.

FIG. 4 is a block diagram illustrating an embodiment of the signal processing unit of FIG. 3. The signal processing unit 160 may include an image decoder 161, a definition enhancer 162, a CSC block 163, and a gamma corrector 164.

Referring to FIG. 4, the signal processing unit 160 may include a plurality of signal processing blocks 161 to 164 that change a video signal inputted from the outside or an internal pattern stored in the memory 150, i.e., the first pattern 210 to a signal having a format that may be processed by the display unit 170.

The image decoder 161 receives and decodes a video signal that is divided into a brightness component (Y) and a color signal component (C). For example, the image decoder 161 may separate U and V from the color signal (C) and output the received video signal as Y, U and V.

As described above, the first pattern 210 stored in the memory 150 may be a video signal that is compressed according to a predetermined coding scheme, and the image decoder 161 may perform an inverse operation of the coding on the compressed video signal of the first pattern 210 to decode the compressed video signal.

On the other hand, since the video signal of the second pattern 220 does not pass through the image decoder 161, the second pattern 220 stored in the memory 150 may be configured with a video signal having a decompressed state, for example, YUV format or RGB format.

The definition enhancer 162 may perform color sense enhancement, contrast enhancement, color enhancement and noise filtering on an input video signal, thereby controlling the definition of an image to be displayed.

According to an embodiment, the definition enhancer 162 may change the display state of the first pattern 210 according to a control value inputted from a user. Also, the second pattern 220 does not pass through the definition enhancer 162, and thus the display state of the second pattern 220 may not be changed according to the input control value.

A frame buffer (not shown), a deinterlacer (not shown), or a scalier (not shown) may be included between the image decoder 161 and the definition enhancer 162. Herein, the frame buffer stores a video signal by frame unit. The deinterlacer converts an interlaced video signal into a signal based on a progressive scheme. The scalier converts a video signal into a signal having a vertical frequency, resolution and a screen rate suitable for the standard of the display unit 170.

The CSC block 163 performs color space conversion on an input video signal to convert the color space into a color space that may be outputted to the display unit 170. For example, the CSC block 163 may convert input YUV signals into RGB video signals.

According to an embodiment, the CSC block 163 may change the display state of the first pattern 210, more specifically, a displayed color value according to a control value inputted from the user. Also, the second pattern 220 does not pass through the CSC block 163, and thus, the display state of the second pattern 220, more specifically, a displayed color value may not be changed according to the input control value.

The second pattern 220 does not pass through the CSC block 163, and thus, a video signal having RGB format displayable on the display unit 170 is generated and stored in the memory 150.

The gamma corrector 164 may correct an input brightness level for a video signal outputted from the CSC block 163, for example, RGB signals according to a predetermined gamma curve and output the corrected signal.

According to an embodiment, the gamma corrector 164 may change the display state of the first pattern 210 according to a control value inputted from a user. Also, the second pattern 220 does not pass through the gamma corrector 164, and thus, the display state of the second pattern 220 may not be changed according to the input control value.

The first pattern 210, which is image-processed and outputted by the signal processing unit 160 including the signal processing blocks 161 to 164, and the second pattern 220 that does not pass through the signal processing unit 160 may be inputted to an image combiner 171.

That is, the image combiner 171 combines a video signal of the first pattern 210 that has been image-processed according to the input control value and the second pattern 220 that does not undergo an image processing operation, thereby allowing the first and second patterns 210 and 220 to be outputted on one screen 200 together.

For example, the image combiner 171 may process the first and second patterns 210 and 220 in separate layers, and the video signal of the second pattern 220 may be directly inputted from the memory 150.

A configuration of the image processing device in FIGS. 3 and 4 merely illustrates a configuration according to an embodiment, and the image processing device according to an embodiment is not limited to a configuration that is as illustrated.

The first pattern 210 where the display state is changed according to the input control value may be a test pattern for definition control. The second pattern 220 where the display state is not changed irrespective of the input control value may be a guide pattern that is a criterion of the first pattern 210, i.e., the test pattern.

Hereinafter, therefore, the first pattern 210 is referred to as the test pattern, and the second pattern 220 is referred to as the guide pattern. On the assumption of this, embodiments will be described below.

A hatching difference illustrated in the following drawings may denote that display states of a corresponding region, for example, definitions such as brightness, color concentration and sharpness on one display screen differ. A region that is displayed in the same hatching on one display screen may denote that the above-described display states are the same.

Hereinafter, in an image processing device for performing the definition control method according to an embodiment, embodiments of a User Interface (UI) provided to a user will be described in detail.

According to a pattern display method for definition control according to an embodiment, as described above, a display state of the test pattern 210 may be changed with the change in an input control value. More specifically, the display state of the test pattern 210 may be changed in order for the display state to be equal to the display state of the guide pattern 220 with the change in the control value.

Figure 5:
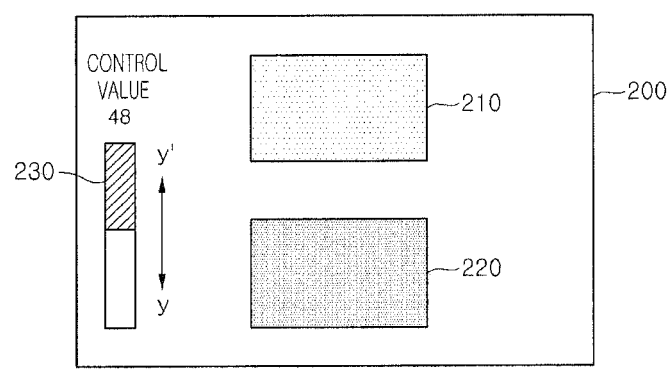
FIGS. 5 to 12 are diagrams illustrating embodiments of a user interface which is provided to a user for definition control.

Referring to FIG. 5, the test pattern 210 and the guide pattern 220 may be adjacently disposed and displayed on the display screen 200. For example, the test pattern 210 and the guide pattern 220 may be adjacently disposed in a vertical direction.

In this case, with the change in the control value, the display state of the test pattern 210 may be progressively changed in order for the display state to be equal to the display state of the guide pattern 220.

For example, as shown in FIG. 5, when the input control value is 48, the test pattern 210 and the guide pattern 220 may differ, and as the control value increases, the display state of the test pattern 210 may be progressively changed in order for the display state to be equal to the display state of the guide pattern 220.

Therefore, when the control value increases and then reaches a specific value, the display state of the test pattern 210 may be visually matched with the display state of the guide pattern 220.

As the control value decreases, the display state of the test pattern 210 may be progressively changed in order for the display state to become different from the display state of the guide pattern 220.

The display state of the test pattern 210 or the display state of the guide pattern 220, as described above, may denote definition characteristics such as brightness, contrast, color concentration, tint, sharpness and backlight brightness that are displayed on the screen 200.

Moreover, the display state of the test pattern 210 being equal to the display state of the guide pattern 220 may denote that a difference between the display state of the test pattern 210 and the display state of the guide pattern 220 that are visually perceived by a user is progressively reduced, i.e., the display state of the test pattern 210 is progressively changed for the display state to be visually matched with the display state of the guide pattern 220.

For example, a definition difference between the test pattern 210 and the guide pattern 220 displayed is clearly perceived by the user before the control value is changed. However, as the control value is changed, the definition difference between the test pattern 210 and the guide pattern 220 that are visually perceived by the user is progressively reduced and then the control value reaches a specific value, in which case the definition difference between the test pattern 210 and the guide pattern 220 may not visually be perceived by the user.

When brightness of the screen 200 is controlled, as the control value is changed, a brightness difference between the test pattern 210 and the guide pattern 220 displayed on the screen 200 or a brightness difference between specific regions included in the respective patterns 210 and 220 is progressively reduced and then the control value reaches a specific value, in which case a brightness difference between the test pattern 210 and the guide pattern 220 may not visually be perceived by the user.

In more detail, when brightness of the test pattern 210 displayed on the screen 200 is lower than brightness of the guide pattern 210, as the control value increases, the brightness of the test pattern 210 increases progressively, and therefore, the brightness difference between the test pattern 210 and the guide pattern 220 decreases progressively. As a result, the brightness difference between the test pattern 210 and the guide pattern 220 may not visually be perceived by the user.

As shown in FIG. 5, an On Screen Display (OSD) for displaying a control value inputted from the user may be displayed on the display screen 200. For example, the control value display OSD may be displayed in a bar type indicating the control value.

The control value display OSD may include a variable region 230 that is variably displayed according to the control value. A region other than the variable region 230 in the control value display OSD may be a fixed region that is not changed irrespective of the control value.

The variable region 230 of the control value display OSD may display a value being a definition factor by using at least one of figures, characters, and abstract displays.

According to an embodiment, the display state of the test pattern 210 may be changed in synchronization with the change in the control value display OSD.

That is, the variable region 230 of the control value display OSD may be changed with the change in the input control value, and as the variable region 230 of the control value display OSD is changed, the display state of the test pattern 210 may be changed in synchronization with the change.

For example, as the control value increases, the variable region 230 of the control value display OSD is changed in a y-side direction, and simultaneously, the display state of the test pattern 210 may be changed.

Moreover, as the control value decreases, the variable region 230 of the control value display OSD is changed in a side direction, and simultaneously, the display state of the test pattern 210 may be changed.

According to another embodiment, a direction where the variable region 230 of the control value display OSD is changed may be matched with a direction where the display state of the test pattern 210 is changed.

In the above description, the change direction of the display state of the test pattern 210 may represent that the display state of the test pattern 210 becomes equal to the display state of an image adjacent to which direction with respect to the position of the test pattern 210.

That is, when the display state of the test pattern 210 is progressively changed in order for the display state to be equal to the display state of the guide pattern 220 adjacent to a first side, the change direction of the display state of the test pattern 210 may be defined as the first side direction.

When the guide pattern 220 is displayed adjacently to the first side of the test pattern 210, as the variable region 230 of the control value display OSD is changed in the first side direction, the display state of the test pattern 210 may be progressively changed in order for the display state to be equal to the display state of the guide pattern 220 adjacent to the first side.

In an embodiment that is illustrated in FIG. 5, for example, as the variable region 230 of the control value display OSD is changed in the y-side direction, the display state of the test pattern 210 may be progressively changed in order for the display state to be equal to the display state of the guide pattern 220 that is adjacently disposed in the y-side direction.

That is, as the variable region 230 of the control value display OSD is changed in the y-side direction, a difference between the display state of the test pattern 210 and the display state of the guide pattern 220 adjacent to the y-side direction may be progressively reduced.

As the variable region 230 of the control value display OSD is changed in the y'-side direction, a difference between the display state of the test pattern 210 and the display state of the guide pattern 220 may increase progressively.

Therefore, when viewed by the user, it may be seen that a direction where the variable region 230 of the control value display OSD is changed is matched with a direction where the display state of the test pattern 210 is changed. Thus, in definition control according to an embodiment, the display state of the test pattern 210 may be intuitively and more easily changed in a specific direction, for example, a direction where the guide pattern 220 is disposed.

That is, as described above, the display state of the test pattern 210 is visually matched with the display state of the guide pattern 220, and thus, when performing definition control according to an embodiment, a user may accord the display state of the test pattern 210 with the display state of the guide pattern 220 adjacent to the first side by moving the variable region 230 of the control value display OSD to the first side.

Figure 6:
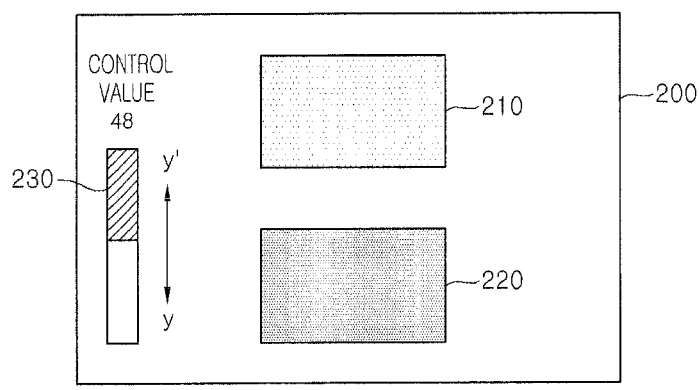

Referring to FIG. 6, the guide pattern 220 may include a plurality of images 221 and 222.

For example, as described above, one of the images 221 and 222 included in the guide pattern 220 may be a standard image having a display state that is a criterion for definition control, i.e., standard definition, and the other may be a sample image having a display state different from that of the standard image.

In more detail, the images 221 and 222 included in the guide pattern 220 may be disposed with respect to the test pattern 210 in a vertical direction or a horizontal direction. As shown in FIG. 6, the standard image 221 may be disposed under the test pattern 210, and the sample image 222 may be disposed over the test pattern 210.

The sample image 222 represents a display state when the test pattern 210 is not displayed in the standard definition, and the user may set the display state of the test pattern 210 to be more accurately matched with the standard definition with the displayed standard image 221 and sample image 222.

That is, as described above, by displaying the standard image 221 and the sample image 222 adjacently to the test pattern 210, the user may more accurately analyze the definition characteristic of the standard image 221, i.e., standard definition required by the test pattern 210 with a difference between the displayed standard image 221 and sample image 222.

In an embodiment that is illustrated in FIG. 6, the display state of the test pattern 210 is changed in synchronization with the change in the control value display OSD, and the display state of the test pattern 210 may be changed in a direction matching with a direction where the variable region 230 of the control value display OSD is changed.

That is, as the control value increases and the variable region 230 of the control value display OSD is changed in the y-side direction, the display state of the test pattern 210 may also be progressively changed in order for the display state to be equal to the display state of the guide pattern 220 adjacently disposed in the y-side direction, i.e., the display state of the standard image 221.

In more detail, as the variable region 230 of the control value display OSD is changed in the y-side direction, a display state difference between the test pattern 210 and the standard image 221 adjacent to the test pattern 210 in the y-side direction may be progressively reduced.

As the variable region 230 of the control value display OSD is changed in the y-side direction, a display state difference between the test pattern 210 and the guide pattern 220 (i.e., the sample image 222) that is disposed adjacently to the test pattern 210 in the y'-side direction may increase progressively.

As the control value decreases and the variable region 230 of the control value display OSD is changed in the y'-side direction, the display state of the test pattern 210 may also be progressively changed in order for the display state to be equal to the display state of the sample image 222 adjacently disposed in the y'-side direction.

In more detail, as the variable region 230 of the control value display OSD is changed in the y'-side direction, a display state difference between the test pattern 210 and the sample image 222 adjacent to the test pattern 210 in the y'-side direction may be progressively reduced.

As the variable region 230 of the control value display OSD is changed in the y'-side direction, a display state difference between the test pattern 210 and the standard image 221 that is disposed adjacently to the test pattern 210 in the y-side direction may increase progressively.

Figure 7:
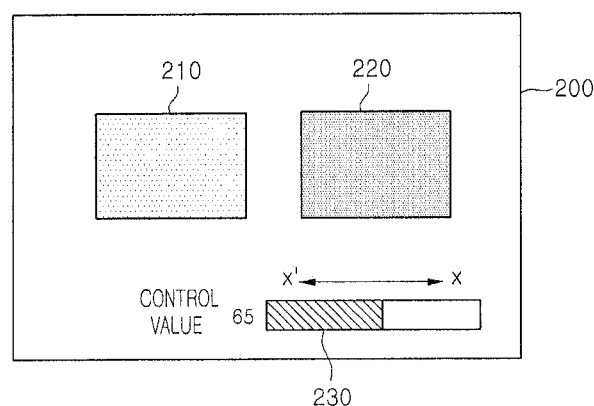

Referring to FIG. 7, the test pattern 210 and the guide pattern 220 may be adjacently disposed in a horizontal direction.

Even in this case, the display state of the test pattern 210 is changed in synchronization with the change in the control value display OSD, and the display state of the test pattern 210 may be changed in a direction matching with a direction where the variable region 230 of the control value display OSD is changed.

That is, as the control value increases and the variable region 230 of the control value display OSD is changed in an x-side direction, the display state of the test pattern 210 may also be progressively changed in order for the display state to be equal to the display state of the guide pattern 220 adjacently disposed in the x-side direction.

Figure 8:
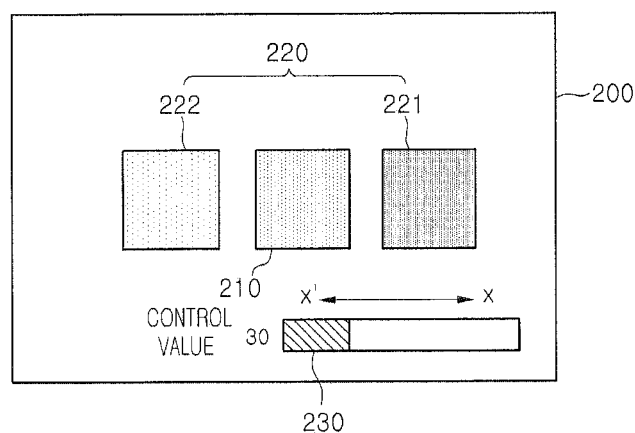

Referring to FIG. 8, the sample image 222 and the standard image 221 included in the guide pattern 220 may be adjacently disposed right and left from the test pattern 210 and displayed.

In an embodiment that is illustrated in FIG. 8, the display state of the test pattern 210 is changed in synchronization with the change in the control value display OSD, and the display state of the test pattern 210 may be changed in a direction matching with a direction where the variable region 230 of the control value display OSD is changed.

That is, as the control value increases and the variable region 230 of the control value display OSD is changed in the x-side direction, the display state of the test pattern 210 may also be progressively changed in order for the display state to be equal to the display state of the standard image 221 adjacently disposed in the x-side direction.

On the other hand, as the variable region 230 of the control value display OSD is changed in an x'-side direction, a display state difference between the test pattern 210 and the sample image 222 disposed at the x' side among the guide pattern 220 may increase progressively.

Furthermore, as the control value decreases and the variable region 230 of the control value display OSD is changed in the x'-side direction, the display state of the test pattern 210 may also be progressively changed in order for the display state to be equal to the display state of the sample image 222 adjacently disposed in the x'-side direction.

As the variable region 230 of the control value display OSD is changed in the y-side direction, a display state difference between the test pattern 210 and the standard image 221 disposed at the xside may increase progressively.

Figure 9:
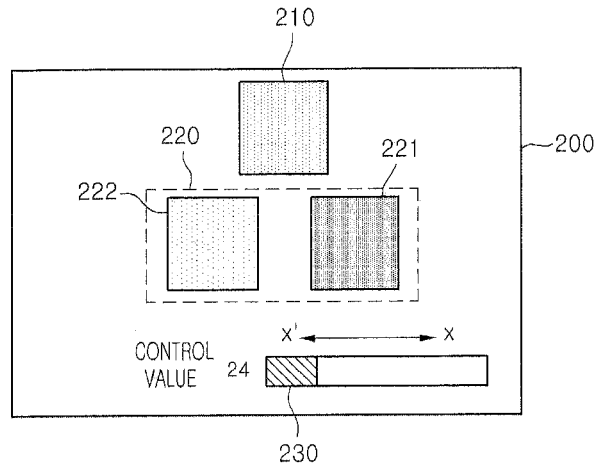

Referring to FIG. 9, the guide pattern 220 including the images 221 and 222 under the test pattern 210 may be displayed.

For example, an image disposed at the x' side among the guide pattern 220 may be the sample image 222, and an image disposed at the x side among the guide pattern 220 may be the standard image 221.

Even in this case, the display state of the test pattern 210 is changed in synchronization with the change in the control value display OSD, and the display state of the test pattern 210 may be changed in a direction matching with a direction where the variable region 230 of the control value display OSD is changed.

That is, as the control value increases and the variable region 230 of the control value display OSD is changed in the x-side direction, the display state of the test pattern 210 may also be progressively changed in order for the display state to be equal to the display state of the standard image 221 disposed at the x side among the guide pattern 220.

On the other hand, as the variable region 230 of the control value display OSD is changed in the x-side direction, a display state difference between the test pattern 210 and the sample image 222 that is disposed adjacently to the test pattern 210 in the x'-side direction may increase progressively.

Furthermore, as the control value decreases and the variable region 230 of the control value display OSD is changed in the x'-side direction, the display state of the test pattern 210 may also be progressively changed in order for the display state to be equal to the display state of the sample image 222 adjacently disposed in the x'-side direction.

As the variable region 230 of the control value display OSD is changed in the y'-side direction, a display state difference between the test pattern 210 and the standard image 221 disposed adjacently to the test pattern 210 in the x-side direction may increase progressively.

Figure 10:
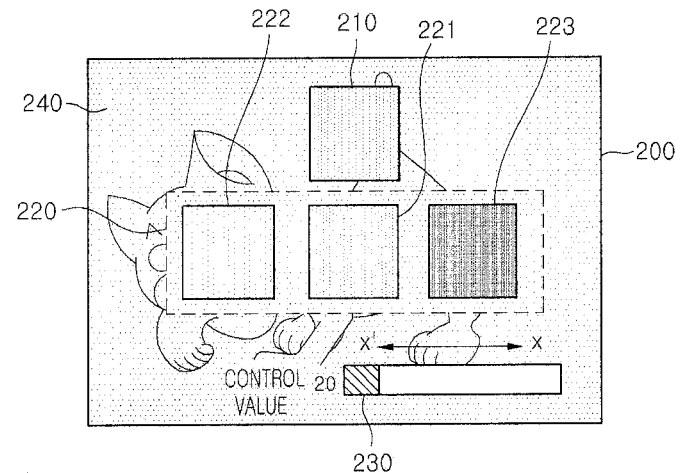

Referring to FIG. 10, the guide pattern 220 displayed under the test pattern 210 may include the standard image 221, and a plurality of sample images 222 and 223 that are arranged right and left from the standard image 221.

For example, the images included in the guide pattern 220 may be sequentially arranged in the x-side direction in the order of the first sample image 222, standard image 221 and second sample image 223.

In this case, the display state of the test pattern 210 is changed in synchronization with the change in the control value display OSD, and the display state of the test pattern 210 may be changed in a direction matching with a direction where the variable region 230 of the control value display OSD is changed.

In an embodiment that is illustrated in FIG. 10, the test pattern 210 may have a display state between the display state of the first sample image 222 and the display state of the standard image 223.

For example, in brightness control, when a control value is 20, brightness where the test pattern 210 is displayed may be brightness between display brightness of the first sample image 222 and display brightness of the standard image 223. That is, the test pattern 210 may be displayed brighter than the first sample image 222, and displayed darker than the standard image 221.

According to an embodiment, as shown in FIG. 10, an image 240 other than the test pattern 210 and the guide pattern 220 may be displayed on the display screen 200.

As shown in FIG. 10, the image 240 may be displayed on the entire region of the display screen 200, and therefore, the image 240 may be a main image that is displayed on the image display device.

As shown in FIG. 10, at least two of a first region where the main image 240 is displayed, a second region where the test pattern 210 is displayed, a third region where the guide pattern 220 is displayed, and a fourth region where the control value display OSD is displayed overlap with each other.

Moreover, the main image 240 displayed on the screen 200 may be changed according to the input control value. More specifically, the display state of the main image 240 and the display state of the test pattern 210 may be simultaneously changed according to the input control value.

For example, as in the video signal of the test pattern 210, a video signal corresponding to the main image 240 may also be signal-processed by the signal processing unit 160 that is as described above with reference to FIGS. 3 and 4 and inputted to the display unit 170, and therefore, the display state of the main image 240 may be changed according to the input control value.

Figure 11:
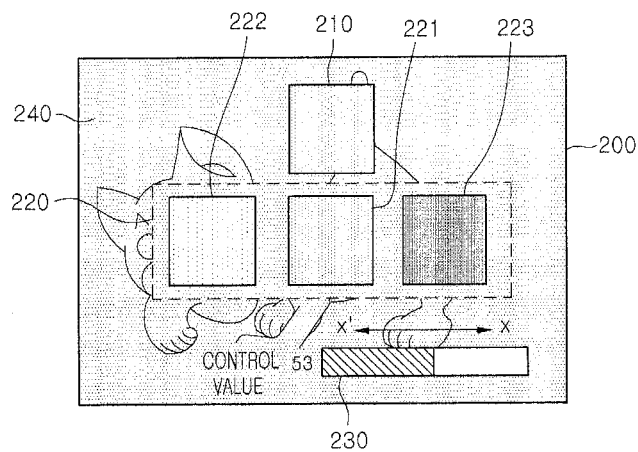

In the above-described state, as the control value increases and the variable region 230 of the control value display OSD is changed in the x-side direction, as shown in FIG. 11, the display state of the test pattern 210 may also be progressively changed in order for the display state to be equal to the display state of the standard image 221 adjacently disposed in the x-side direction.

On the other hand, as the variable region 230 of the control value display OSD is changed in the x-side direction, a display state difference between the test pattern 210 and the first sample image 222 disposed at the x' side of the standard image 221 may increase progressively.

As the variable region 230 of the control value display OSD is changed in the x-side direction, the display state of the test pattern 210 may also be progressively changed in order for the display state to be equal to the display state of the second sample image 223 disposed at the x side of the standard image 221.

Moreover, when the control value increases and the variable region 230 of the control value display OSD reaches a first position, the display state of the test pattern 210 may be visually matched with the display state of the standard image 221.

As described above, at a time when the display state of the test pattern 210 may be visually matched with the display state of the standard image 221, the control value is set as a first value corresponding to the position of the variable region 230 of the control value display OSD, i.e., the first position, and thus definition control according to an embodiment may be performed.

In this way, as the control value increases, the display state of the test pattern 210 is changed, and simultaneously, the display state of the main image 230 is changed.

For example, as the control value is changed, brightness of the test pattern 210 decreases, in which case brightness of the main image 230 may be reduced at the same time. Also, as the control value is changed, color concentration of the test pattern 210 decreases, in which case color concentration of the main image 230 may be reduced at the same time.

Definition characteristic of the main image 230 may be the same as that of the test pattern 210 or definition characteristic of a partial region included in the test pattern 210. As the control value is changed, the display state of the main image 230 and the display state of at least one partial region of the test pattern 210 that has the same definition characteristic as that of the main image 230 may be simultaneously changed.

Figure 12:
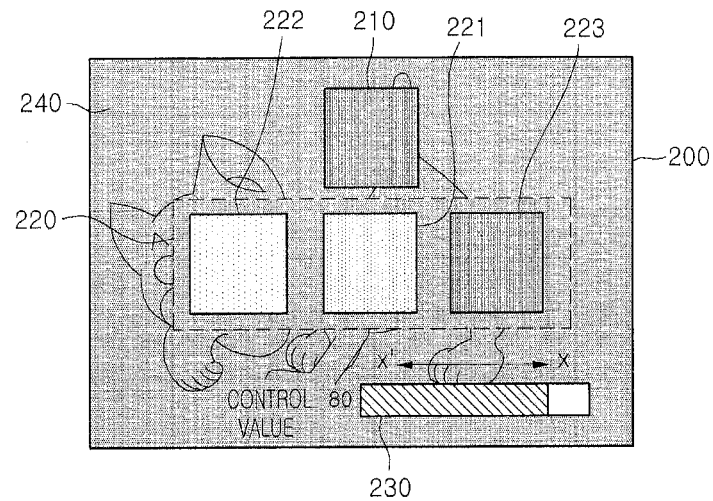

Furthermore, as the control value increases to above the first value, the variable region 230 of the control value display OSD is changed in the x-side direction through the first position, as shown in FIG. 12, in which case the display state of the test pattern 210 may also be progressively changed in order for the display state to be equal to the display state of the second sample image 223 disposed at the x side of the standard image 221.

On the other hand, the variable region 230 of the control value display OSD is changed in the x-side direction through the first position, a display state difference between the test pattern 210 and the standard image 221 may increase progressively.

Moreover, the variable region 230 of the control value display OSD is changed in the x-side direction through the first position, a display state difference between the test pattern 210 and the first sample image 222 may increase progressively.

Figure 13:
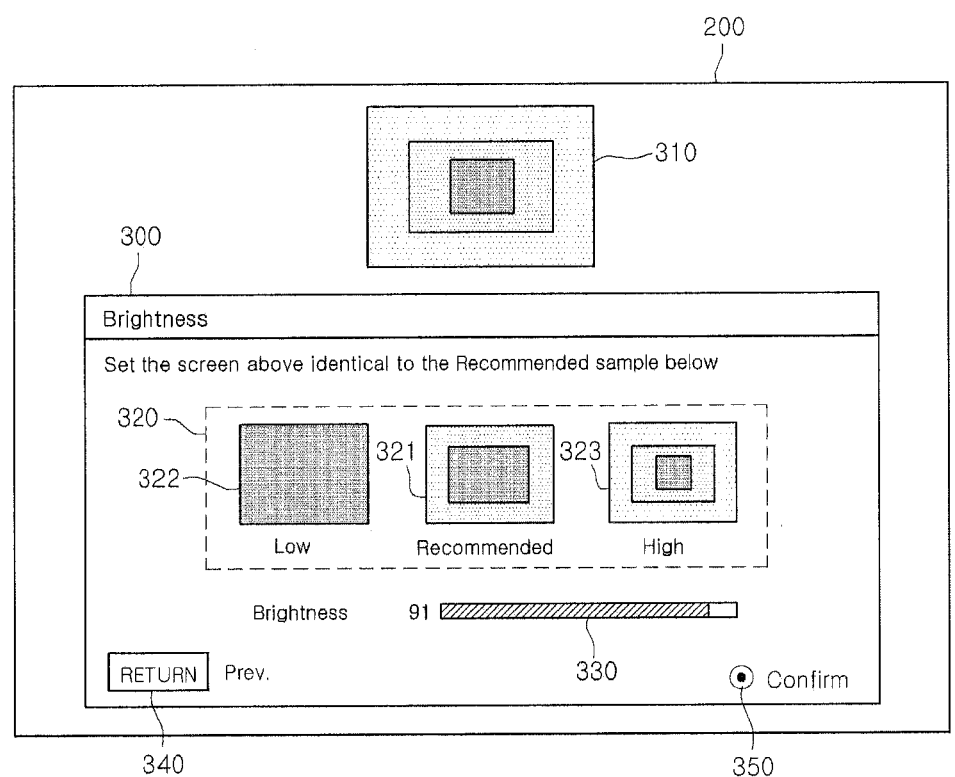
FIG. 13 is a diagram illustrating an embodiment of a brightness control method of an image display device.

Referring to FIG. 13, the variable region 230 of the control value display OSD is changed in the x-side direction through the first position, the display state of the main image 240 may also be changed together with the display state of the test pattern 210.

As described above, the definition control method according to an embodiment may be sequentially performed for the respective definition items, for example, brightness, contrast, color concentration, tint, sharpness, and backlight brightness.

Hereinafter, embodiments of a method that performs the respective definition items will be described with reference to FIGS. 13 to 38.

FIG. 13 illustrates an embodiment of a brightness control method of an image display device. Description on the same elements of FIG. 13 as the elements that have been described above with reference to FIGS. 1 to 12 will not be provided.

Referring to FIG. 13, a plurality of patterns 310 and 320 for controlling the brightness of the definition items may be displayed on the display screen 200.

An external video signal is image-processed by the signal processing unit 160 included in the image display device and then is displayed on the display unit 170, but definition of a displayed image may differ from definition of the original video, i.e., standard definition due to a default value of the control value applied to image processing of the image processing unit 160 or definition setting that is not well made by a user.

For example, when the user has set brightness to a small value (when a brightness control value is small set, black regions of an image may not be distinguished. When the user has set brightness to a large value (when the brightness control value is largely set, white regions of an image may not be distinguished.

That is, when a brightness control value of an image is small set in the image display device, color reproductability may decrease for black regions of the image. On the other hand, when the brightness control value is largely set, color reproductability may decrease for white regions of the image.

In the definition control method according to an embodiment, brightness that is displayed on the display unit 170 and is visually viewed by the user may be set so as to be in correspondence with the above-described standard definition.

Figure 14:
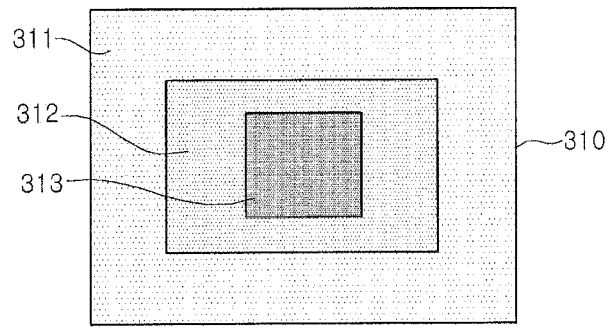
FIGS. 14 and 15 are diagrams illustrating a display status of a first pattern for brightness control according to a first embodiment.

Referring to FIG. 13, the test pattern 310 may include a plurality of regions having different brightness. For example, as shown in FIG. 14, the test pattern 310 may include first to third regions 311 to 313 having different brightness.

More specifically, the second region 312 may have about 0 IRE brightness, the first region 311 may have brightness higher than that of the second region 312, and the third region 313 may have brightness lower than that of the second region 312.

According to an embodiment, the brightness of a first region 311 may be +4 IRE; the brightness of a second region 312 may be 0 IRE; and the brightness of a third region 313 may be −4 IRE, in a test pattern 310.

Here, if color reproduction is realized with 8 bits, color brightness is expressed with gradations of 0 to 255 and color reproduction for gradations of 16 to 235 is realized based on definition standards. At this point, if 16 gray scale, which is the darkest black, is set with 0 IRE, 8 gray scale may be set as −4 IRE and 24 gray scale may be set as +4 IRE.

That is, if the brightness of an image is set with standard definitions, image data of the 8 gray scale and image data of 16 gray scale are displayed on a display screen 200 without discrimination and image data of the 16 gray scale and image data of 24 gray scale are displayed on a display screen 200 without discrimination.

Figure 15:
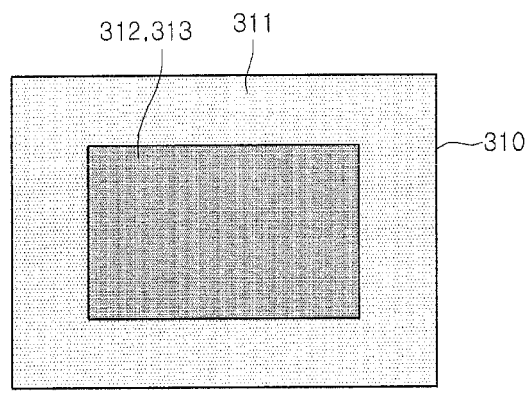

Accordingly, as shown in FIG. 15, brightness difference between the second region 312 and the third region 131 in the test pattern 310 is not visually distinguished by a user and brightness different between the first region 311 and the second region 312 is visually distinguished by a user when the brightness is set with the standard definitions.

Figure 16:
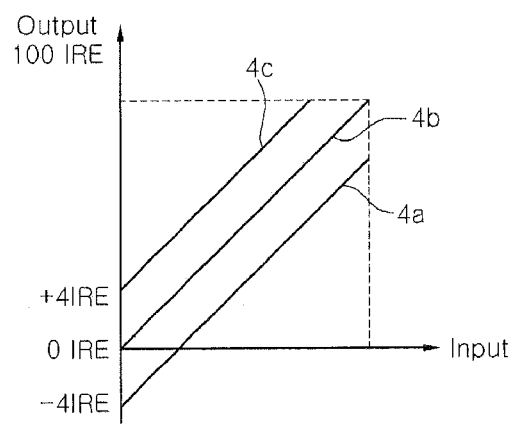
FIG. 16 is a graph illustrating a brightness change of a screen according to a control value.

Referring to FIG. 16, a case that the brightness of an image is not set with standard definitions is shown as 4a and 4c, and a case of being set with standard definitions is shown as 4b.

Controlling the brightness of an image is changing a y-intercept of a line as shown in FIG. 16 and if the brightness is increased, the y-intercept of the line may be increased and if the brightness is decreased, the y-intercept of the line may be decreased.

If a brightness level is set with the line 4a or the line 4c, color reproductability about black or white gray scales is deteriorated. In a case of the line 4a, gray scales from −4 IRE to 96 IRE, at which color reproduction is substantially possible, may be displayed on the display screen 200 and in a case of the line 4c, gray scales from +4 IRE to 104 IRE may be displayed on the display screen 200.

In relation to a definition control method according to an embodiment, like 4b shown in FIG. 16, brightness may be controlled for allowing gray scales from 0 IRE to 100 IRE to be expressed on the display screen 200.

That is, a case that color reproduction is realized with 8 bits; 16 gray scale is 0 IRE; and 235 gray scale is 100 IRE may be defined as standard definition. In the case of standard definition, if image data express less than 16 gray scale, all are displayed with 0 IRE on the display screen 200 and if image data express more than 235 gray scale, all are displayed with 100 IRE on the display screen 200.

Moreover, the above configuration of the test pattern 310 is just one embodiment and accordingly, the brightness or form of each of the first, second, and third regions 311, 312, and 313 may vary. For example, the first, second, and third regions 311, 312, and 313 constituting the test pattern 310 may have −2 IRE, 0 IRE, and +2 IRE, respectively.

Furthermore, a brightness control menu window 300 displaying a guide pattern 320 including a plurality of images 321, 322, and 323 may be displayed on the display screen 200.

A standard image 321 (i.e., Recommended) arranged at the center of the guide pattern 320 is a criterion for setting the brightness of an image as the brightness of standard definition. A user may set the brightness of standard definition by setting a control value to allow the test pattern 310 and a display status of the standard image 321, i.e., the brightness of regions in each pattern, to be visually identical.

For this, the standard image 321 is generated with contrast to allow the test pattern 310 to be displayed in the above standard definition and then is stored in the memory 150. In more detail, the standard image 321 may have the same brightness characteristic as the line of 4b described with reference to FIG. 16.

That is, the standard image 321 includes a first region and a second region having respectively different brightness. The first region of the standard image 321 has a position in a pattern corresponding to a first region 311 of a test image 310 and the second region of the standard image 321 has a position in a pattern corresponding to second and third regions 312 and 313 of the test image 310.

Accordingly, when the test pattern 310 and a display status of the standard image 321 are visually identical, each of the regions 311, 312, and 313 in the test pattern 310 has brightness identical to those shown in FIG. 15. Thus, the brightness of an image to be displayed may be set to be identical to the brightness of standard definition, i.e., it may be set to be seen actually identical based on a corresponding user's view.

Moreover, a first sample image 322 (i.e. Low) at the left of the standard image 321 among the guide pattern 320 represents a display status of the test pattern 310 when a control value inputted by a user, i.e., a brightness control value, is low.

That is, as a user reduces a control value, a variable region 230 of a control value display OSD changes into the left direction. Accordingly, a display status of the test pattern 310 may be gradually changed to be identical to the first sample image 322 (i.e., Low).

As shown in FIG. 13, the first sample image 322 (i.e., Low) is am image where an entire region has a uniform brightness, in more detail, has the same brightness characteristic as the line 4a described with reference to FIG. 16. Therefore, that is a case that all image data from −4 IRE to +4 IRE may be displayed as 0 IRE.

That is, if the brightness control value is very low, the regions 311, 312, and 313 of the test pattern 310 having respective brightness of +4 IRE, 0 IRE, and −4 IRE may be all displayed as 0 IRE like the first sample image 322 (i.e., Low).

Additionally, a second sample image 323 (i.e., High) at the right of the standard image 321 among the guide pattern 320 may represent a display status of the test pattern 310 if a control value inputted by a user, i.e., a brightness control value, is high.

That is, as a user increases a control value, a variable region 230 of a control value display OSD changes into the right direction. Accordingly, a display status of the test pattern 310 may be gradually changed to be identical to the second sample image 323 (i.e., High).

As shown in FIG. 13, the second sample image 323 includes three regions having respectively different brightness, in more detail, has the same brightness characteristic as the line 4c described with reference to FIG. 16, so that image data from −4 IRE to 0 IRE are expressed on a screen.

That is, if a brightness control value is very high, like the second sample image (i.e., High), the regions 311, 312, and 313 of the test pattern 310 having respective brightness of +4 IRE, 0 IRE and −4 IRE are displayed with respectively different brightness so that a user may visually recognize them.

Accordingly, as shown in FIG. 13, a phrase "control a brightness value to make a display status of the test pattern 310 and a display status of the standard image (i.e., Recommended) 321 displayed at the bottom be identical to each other" may be displayed on the brightness control menu window 300 and accordingly, a user may be induced to set a control value by matching the test pattern 310 with a display status of the standard image (i.e., Recommended) 321.

As shown in FIG. 13, definition item (i.e., brightness) to be adjusted is displayed on the brightness control menu window 300 and a control value display OSD 330 for representing the inputted brightness control value and a plurality of input buttons 340 and 350 may be displayed on the brightness control menu window 300.

For example, a "RETURN" button 340 is used for returning to a previous page or a previous definition item and a "☉" button is used for setting the brightness with a current inputted control value.

That is, when the test pattern 310 and a display status of the standard image 321, i.e., the brightness of each region, are visually identical, a user selects the "☉" button 350 to set a brightness level with a control value at the identical point.

Moreover, the "RETURN" button 340 and the "☉" button 350 may be included in an image display device and unlike this, may be included in a remote controller (not shown) at the external of the image display device.

Furthermore, the test pattern 310 described with reference to FIGS. 13 to 15 is just one embodiment, so that the form, size, region count, and each region's brightness of the test pattern 310 may vary.

For example, a plurality of regions 311, 312, and 313 in the test pattern 310 may be sequentially arranged based on a specific direction.

For example, the first region 311 is disposed adjacent to the left of the second region 312 in the test pattern 310 and the third region 313 is disposed adjacent to the right of the second region 312.

Additionally, the first, second, and third regions 311, 312, and 313 in the test pattern 310 may have respective brightness of −4 IRE, 0 IRE and +4 IRE or −2 IRE, 0 IRE and +2 IRE.

Figure 17:
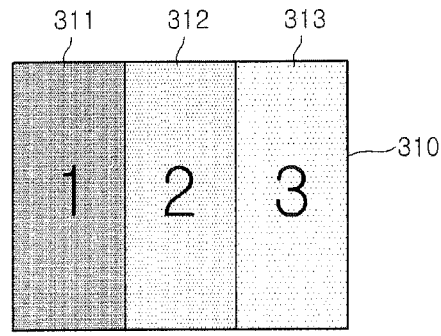
FIGS. 17 and 18 are diagrams illustrating a display status of a first pattern for brightness control according to a second embodiment.
Figure 18:
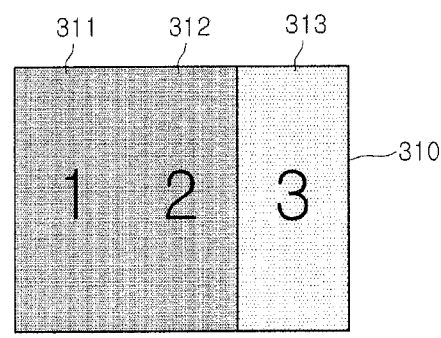

Moreover, if a control value is set to allow a display status of the test pattern 310 shown in FIG. 17 to be identical to FIG. 18, the image brightness is set as the brightness of standard definition.

That is, as shown in FIG. 18, a control value may be changed and set so that the brightness difference between the first and second regions 311 and 312 in the regions 311, 312, and 313 in the test pattern 310 is not visually recognizable to a user and the brightness difference between the second and third regions 312 and 313 is visually recognizable to a user.

In this case, the standard image 321 in the guide pattern 320 may have a form and brightness as shown in FIG. 18. That is, the standard image 321 includes a first region corresponding to the first and second regions 311 and 312 of the test pattern 310 and a second region corresponding to the third region 313 of the test pattern 310. Also, the first and second regions are arranged at the left and the right.

Figure 19:
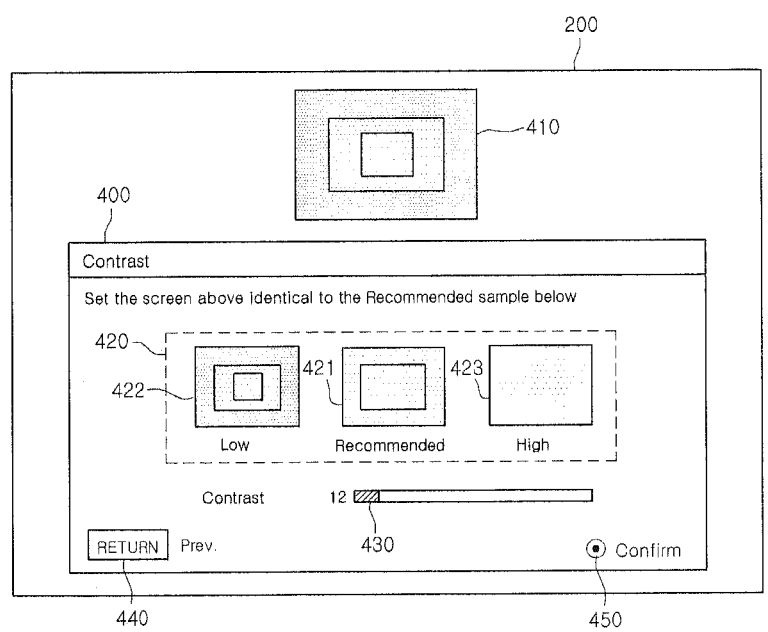
FIG. 19 is a diagram illustrating a contrast control method of an image display device according to an embodiment.

FIG. 19 is a view illustrating a contrast control method of an image display device according to an embodiment. The overlapping description about components of FIG. 19 related to FIGS. 1 to 18 will be omitted.

Referring to FIG. 19, patterns 410 and 420 for controlling contrast among a plurality of definition control items may be displayed on the display screen 200.

Figure 20:
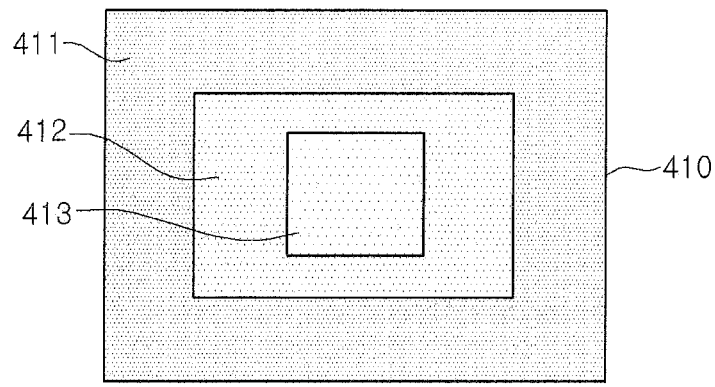
FIGS. 20 and 21 are diagrams illustrating a display status of a first pattern for contrast control according to first embodiment.

A test pattern 410 may include a plurality of regions having respectively different brightness and for example, as shown in FIG. 20, may include a first region 411, a second region 412, and a third region 413 of respectively different brightness.

In more detail, the first region 411 may have a lower brightness than the second region 412 and the third region 4123 may have a higher brightness than the second region 412. For example, the second region 412 may have brightness of about 100 IRE.

According to an embodiment, the brightness of the first region 411 in the test pattern 410 may be 97.5 IRE; the brightness of the second region 412 may be 100 IRE, and the brightness of the third region 413 may be 102.5 IRE.

Figure 21:
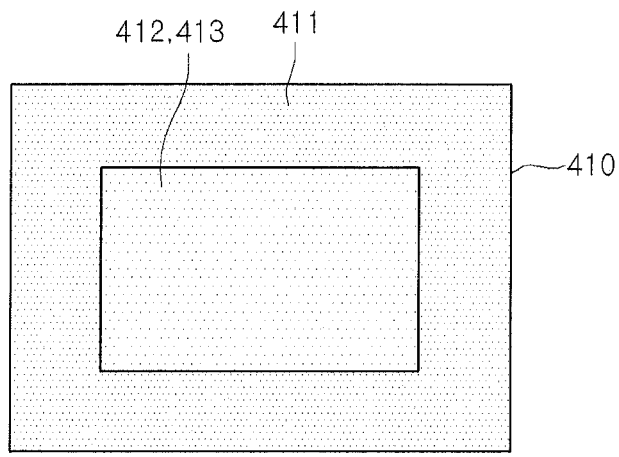

If the brightness of an image is set with standard definition, as shown in FIG. 21, the brightness difference between the second region 412 and the third region 413 in the test pattern 410 is not visually recognizable to a user and the brightness difference between the first region 411 and the second region 412 may be visually recognizable to a user.

Figure 22:
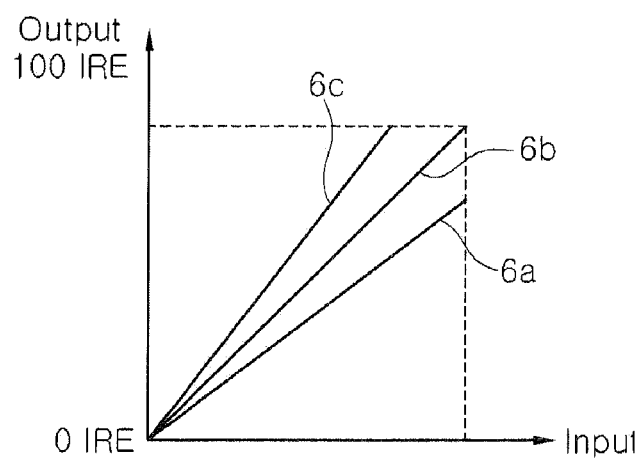
FIG. 22 is a graph illustrating a contrast change of a screen according to a control value.

Referring to FIG. 22, a case that a contrast of an image is not set with standard definition is shown as 6a and 6c, and a case of standard definition is shown as 6b.

Controlling a contrast of an image is changing a slope of a straight line in a graph as shown in FIG. 22 and thus, as the contrast is increased, the slope of the straight line is increased and if the contrast may be decreased, the slop of the straight line may be decreased.

If a brightness level is set with the line of 6a or 6c, color reproductability for white gray scale is deteriorated. In the case of the line 6a, image data having a gray scale of more than 100 IRE are expressed on the display screen 200 and in the case of the line 4c, only the image data having a gray scale of less than 100 IRE, i.e., a gray scale of about 95 IRE, are expressed on the display screen 200.

That is, in the case of the line 4c, image data of the more than 95 IRE gray scale may not be displayed on the display screen 200 and all are displayed with 100 IRE.

In relation to a definition control method according to an embodiment, as 6b shown in FIG. 22, contrast may be controlled to display a gray scale from 0 IRE to 100 IRE on the display screen 200.

That is, as mentioned above, the first region 411 having a brightness of 97.5 IRE and the second region 412 having a brightness of 100 IRE in the test pattern 410 are displayed so that brightness difference may be visually recognizable to a user. The second region 412 having a brightness of 100 IRE and the third region 413 having a brightness of 102.5 IRE are displayed so that brightness difference is not recognizable to a user. As a result of that, the contrast of an image may be set as standard definition.

Moreover, the above configuration of the test pattern 410 is just one embodiment and accordingly, the brightness or form of each of the first, second, and third regions 411, 412, and 413 may vary. For example, the first, second, and third regions 411, 412, and 413 constituting the test pattern 410 may have respective brightness of 104 IRE, 106 IRE, and 108 IRE.

Additionally, a contrast control menu window 400 displaying a guide pattern 420 with a plurality of images 421, 422, and 423 may be displayed on the display screen 200.

A standard image (i.e., Recommended) 421 arranged at the center of the guide pattern 320 is a criterion for setting the contrast of an image as the contrast of standard definition. A user may set the contrast of standard definition by setting a control value to allow the test pattern 410 and a display status of the standard image 421, i.e., the brightness of regions in each pattern, to be visually identical.

For this, the standard image 321 is generated with contrast to allow the test pattern 310 to be displayed in the above standard definition and then is stored in the memory 150. In more detail, the standard image 321 may have the same brightness characteristic as the line of 6b described with reference to FIG. 22.

That is, the standard image 421 includes a first region and a second region having respectively different brightness. The first region of the standard image 421 has a position in a pattern corresponding to a first region 411 of a test image 410 and the second region of the standard image 421 has a position in a pattern corresponding to second and third regions 412 and 413 of the test image 410.

Accordingly, when the test pattern 410 and a display status of the standard image 421 are visually identical, each of the regions 411, 412, and 413 in the test pattern 410 has brightness identical to those shown in FIG. 21. Thus, the contrast of an image to be displayed may be set to be identical to the contrast of standard definition, i.e., it may be set to be seen actually identical based on a corresponding user's view.

Moreover, a first sample image 422 (i.e. Low) at the left of the standard image 421 among the guide pattern 420 represents a display status of the test pattern 410 when a control value inputted by a user, i.e., a contrast control value, is low.

That is, as a user reduces a contrast value, a variable region 230 of a control value display OSD changes into the left direction. Accordingly, a display status of the test pattern 410 may be gradually changed to be identical to the first sample image 422 (i.e., Low).

As shown in FIG. 19, the first sample image 422 (i.e. Low) includes three regions having respectively different brightness. In more detail, as it has the same brightness characteristic as the line 6a described with reference FIG. 22, image data from 100 IRE to 102.5 IRE may be displayed on the display screen 200.

That is, if a contrast value is very low, like the first sample image 421 (i.e., Low), the regions 411, 412, and 413 in the test pattern 410 having respective brightness of 97.5 IRE, 100

IRE, and 102.5 IRE are displayed with respectively different brightness so that it may be visually recognizable to a user.

Moreover, a second sample image 423 (i.e., High) at the right of the standard image 421 in the guide pattern 420 represents a display status of the test pattern 410 when a control value inputted by a user, i.e., a contrast value, is high.

That is, as a user reduces a control value, a variable region 230 of a control value display OSD changes into the right direction. Accordingly, a display status of the test pattern 410 may be gradually changed to be identical to the second sample image 422 (i.e., High).

As shown in FIG. 19, the second sample image 423 (i.e., High) is am image where an entire region has a uniform brightness, in more detail, has the same brightness characteristic as the line 6c described with reference to FIG. 22. Therefore, that is a case that all image data having a gray scale more than 97.5 may be displayed as 100 IRE.

That is, if a contrast control value is very high, like the second sample image 422 (i.e., High), all the regions 411, 412, and 413 of the test pattern 410 having respective brightness of 97.5 IRE, 100 IRE, and 102.5 IRE may be displayed as 100 IRE gray scale, i.e., white color.

When the test pattern 410 and a display status of the standard image 421, i.e., the brightness of each region, are visually identical, a user selects the "⊙" button 450 to set a contrast level with a control value at the identical point.

Furthermore, the test pattern 410 described with reference to FIGS. 19 to 22 is just one embodiment, so that the form, size, region count, and each region's brightness of the test pattern 310 may vary.

Figure 23:
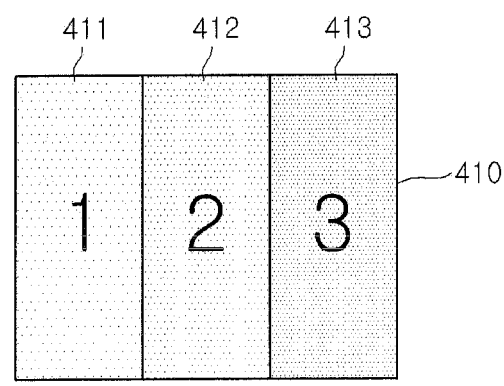
FIGS. 23 and 24 are diagrams illustrating a display status of a first pattern for contrast control according to a second embodiment.

Referring to FIG. 23, a first region 11 is disposed adjacent to the left of the second region 412 in the test pattern 410 and a third region 13 is disposed adjacent to the right of the second region 412. The first, second, and third regions 411, 412, and 413 may have respective brightness of 97.5 IRE, 100 IRE and 102.5 IRE or 104 IRE, 106 IRE and 108 IRE.

Figure 24:
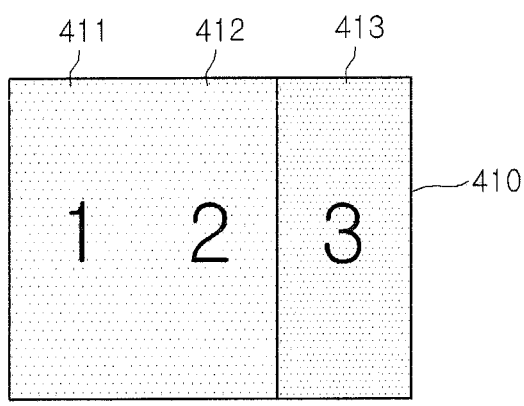

Moreover, if a control value is set to allow a display status of the test pattern 410 shown in FIG. 23 to be identical to FIG. 24, the image contrast is set as the contrast of standard definition.

That is, as shown in FIG. 24, a control value may be changed and set so that the brightness difference between the first and second regions 411 and 412 in the regions 411, 412, and 413 in the test pattern 410 is not visually recognizable to a user and the brightness difference between the second and third regions 412 and 413 is visually recognizable to a user.

In this case, the standard image 421 in the guide pattern 420 may have a form and brightness as shown in FIG. 24. That is, the standard image 421 includes a first region corresponding to the first and second regions 411 and 412 of the test pattern 410 and a second region corresponding to the third region 413 of the test pattern 410. Also, the first and second regions are arranged at the left and the right.

Figure 25:
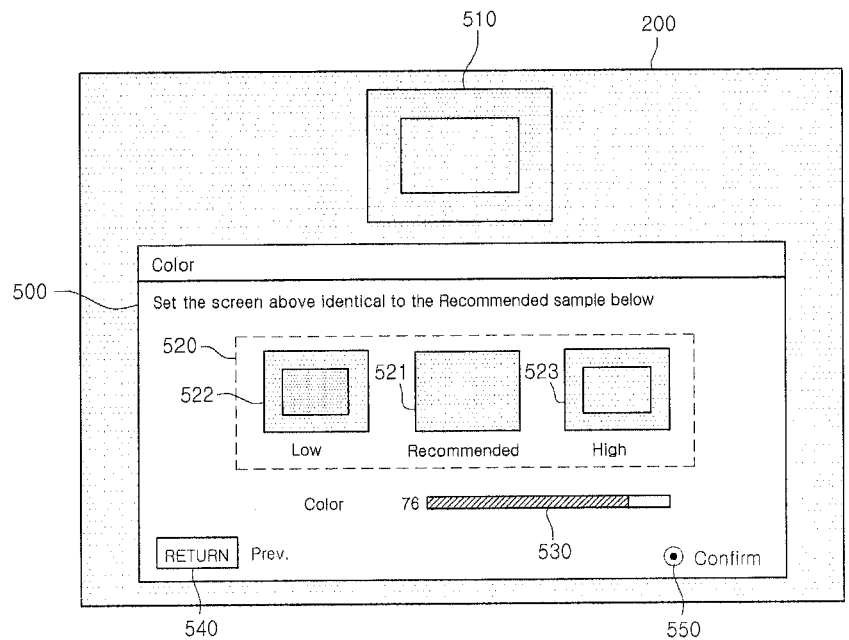
FIG. 25 is a diagram illustrating a color control method of an image display device according to an embodiment.

FIG. 25 is a view illustrating a color control method of an image display device according to an embodiment. The overlapping description about components of FIG. 25 related to FIGS. 1 to 24 will be omitted.

Referring to FIG. 25, patterns 510 and 520 for controlling color among a plurality of definition control items may be displayed on the display screen 200.

A test pattern 510 may include a plurality of regions having respectively different brightness and for example, as shown in FIG. 25, may include a first region 511 and a second region 512 of respectively different brightness.

In more detail, the first region 511 may have white color and the second region 512 may have one of a plurality of colors such as red, green, blue.

According to an embodiment, the first region 511 in the test pattern 510 may include image data corresponding to 75% white color of R:G:B=75%:75%:75%, and the second region 512 may include image data corresponding to 75% blue color.

Moreover, an image signal of the test pattern 410 is outputted to the display unit 170 after only a signal corresponding to blue color is extracted at the final terminal of the signal processing unit 160 and accordingly, the display unit 170 displays only blue color in the test pattern 510.

In more detail, referring to FIG. 4, the gamma collector 164 outputs only blue color from an image signal of the inputted test pattern 510 and for example, only a signal corresponding to blue color in an image signal of the test pattern 410 in which a YUV signal is converted into a RGB signal by the CSC block 163 is filtered and outputted to the image combiner 171.

Moreover, when a color value, a control value inputted from a user, is changed, the second region 512 may be displayed with a different color. That is, as the inputted color value is increased, a blue color of the second region 512 to be displayed may be increased and as the inputted color value is decreased, a blue color of the second region 512 to be displayed may be decreased.

Unlike this, in a case of the first region 511 having white color, even if the inputted control value is changed, a display status, i.e., color to be displayed, is not changed. That is, even if the inputted color value is increased or decreased, the blue color of the first region 511 maintains its original 75% and accordingly, regardless of the inputted control value, the color to be displayed of the first region 511 may maintain blue color of uniform color.

Figure 27:
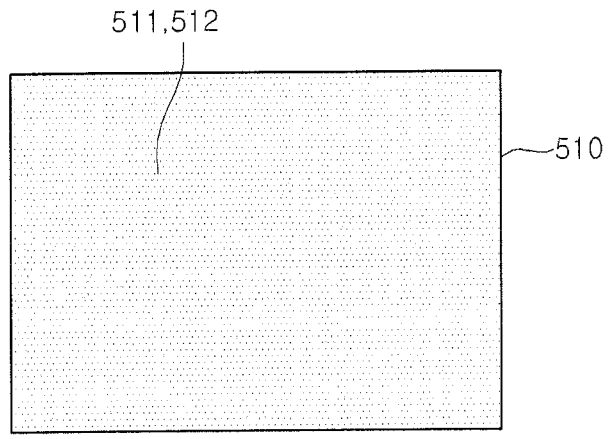

If the color concentration of an image is set with standard definition, as shown in FIG. 27, the color difference to be displayed of the first region 511 and the second region 512 in the test pattern 410 may not be visually recognizable to a user.

That is, by allowing the first region 511 having 75% white color and the second region 512 having 75% blue color to be recognizable as the same color to a user, the color concentration of an image may be set as standard definition.

Moreover, the above configuration of the test pattern 410 is just one embodiment and accordingly, a color or form of each of the first and second regions 511 and 512 may vary.

Furthermore, a color control menu window 500 displaying a guide pattern 520 with a plurality of images 521, 522, and 523 may be displayed on the display screen 200.

A standard image 521 (i.e., Recommended) arranged at the center of the guide pattern 520 is a criterion for setting the color concentration of an image as standard definition. A user may set the color concentration of standard definition by setting a control value to allow the test pattern 510 and a display status of the standard image 521, i.e., the brightness of regions in each pattern, to be visually identical.

For this, the standard image 521 is generated with color to allow the test pattern 510 to be displayed in the above standard definition and then is stored in the memory 150. In more detail, the standard image 521 may include one region having uniform color as shown in FIG. 27.

Accordingly, when the test pattern 510 and a display status of the standard image 521 are visually identical, each of the regions 511 and 512 in the test pattern 510 has colors identical to those shown in FIG. 27. Thus, the color concentration of an image to be displayed may be set to be identical to the color concentration of standard definition, i.e., it may be set to be seen actually identical based on a corresponding user's view.

Moreover, a first sample image 522 (i.e. Low) at the left of the standard image 521 among the guide pattern 520 represents a display status of the test pattern 510 when a control value inputted by a user, i.e., a color control value, is low.

That is, as a user reduces a color value, a variable region 230 of a control value display OSD changes into the left direction. Accordingly, a display status of the test pattern 510 may be gradually changed to be identical to the first sample image 522 (i.e., Low).

As shown in FIG. 25, the first sample image 522 (i.e. Low) includes two regions having respectively different colors. In more detail, it may include a first region and a second region that is disposed in the first region and has low blue color than the first region.

That is, if the color value is very low, the blue color to be displayed of the second region 512 in the test pattern 510 is reduced. Thus, the first and second regions 511 and 512 are displayed with respectively different colors like the first sample image 521 (i.e., Low) and thus may be visually recognizable to a user. In this case, in more detail, like the first sample image 521 (i.e., Low), the second region 512 in the test pattern 510 may be displayed with a lower blue color than the first region 511.

The second sample image 522 (i.e., High) at the right of the standard image 521 in the guide pattern 520 represents a display status of the test pattern 510 when a control value inputted by a user, i.e., a color control value, is high.

That is, as a user reduces a color value, a variable region 230 of a control value display OSD changes into the right direction. Accordingly, a display status of the test pattern 510 may be gradually changed to be identical to the second sample image 522 (i.e., High).

As shown in FIG. 25, the second sample image 522 (i.e., High) includes two regions having respectively different colors. In more detail, it may include a first region and a second region that is disposed in the first region and has low blue color than the first region.

That is, if the color value is very high, the blue color to be displayed of the second region 512 in the test pattern 510 is increased. Thus, the first and second regions 511 and 512 are displayed with respectively different colors and thus may be visually recognizable to a user. In this case, in more detail, like the second sample image 522 (i.e., High), the second region 512 in the test pattern 510 may be displayed with a higher blue color than the first region 511.

A user selects the "⊙" button 550 when the test pattern 510 and a display status of the standard image 521, i.e., color concentration of each region, are visually identical and thus, may set a color level with a control value at the identical point.

Figure 26:
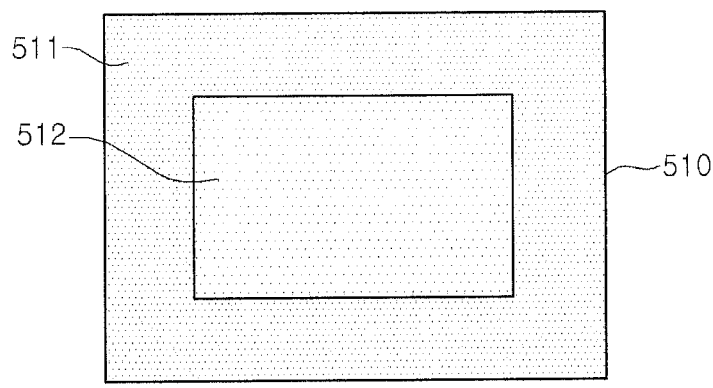
FIGS. 26 and 29 are diagrams illustrating a display status of a first pattern for color control according to a first embodiment.

Furthermore, the test pattern 510 described with reference to FIGS. 25 to 27 is just one embodiment, so that the form, size, region count, and each region's brightness of the test pattern 510 may vary.

Figure 28:
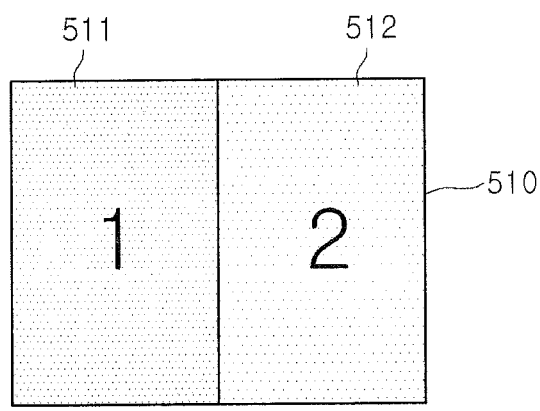

Referring to FIG. 28, the test pattern 510 includes first and second regions 511 and 512 displayed adjacent to the left and the right and the first and second regions 511 and 512 may have the above 75% white color and 75% blue color, respectively.

Figure 29:
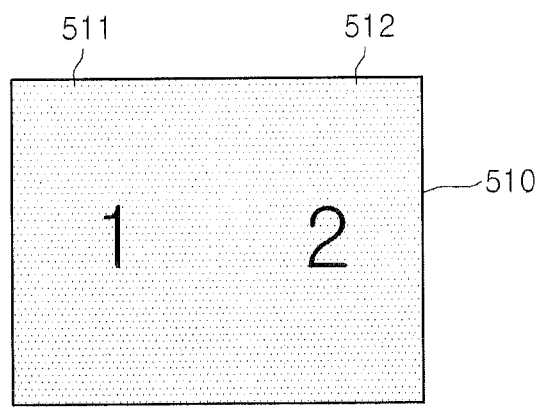

Moreover, when a control value is set to allow a display status of the test pattern 510 as shown in FIG. 28 to be identical to FIG. 29, the color concentration of an image may be set as standard definition.

That is, as shown in FIG. 29, a color value may be changed and set so that the color difference of the first and second regions 511 and 512 in the test pattern 510 is not visually recognizable to a user.

In this case, the standard image 521 in the guide pattern 520 may have the same form and color as those in FIG. 29.

Moreover, although a method of controlling color through blue color, color may be controlled using red or green color other than blue color.

Figure 30:
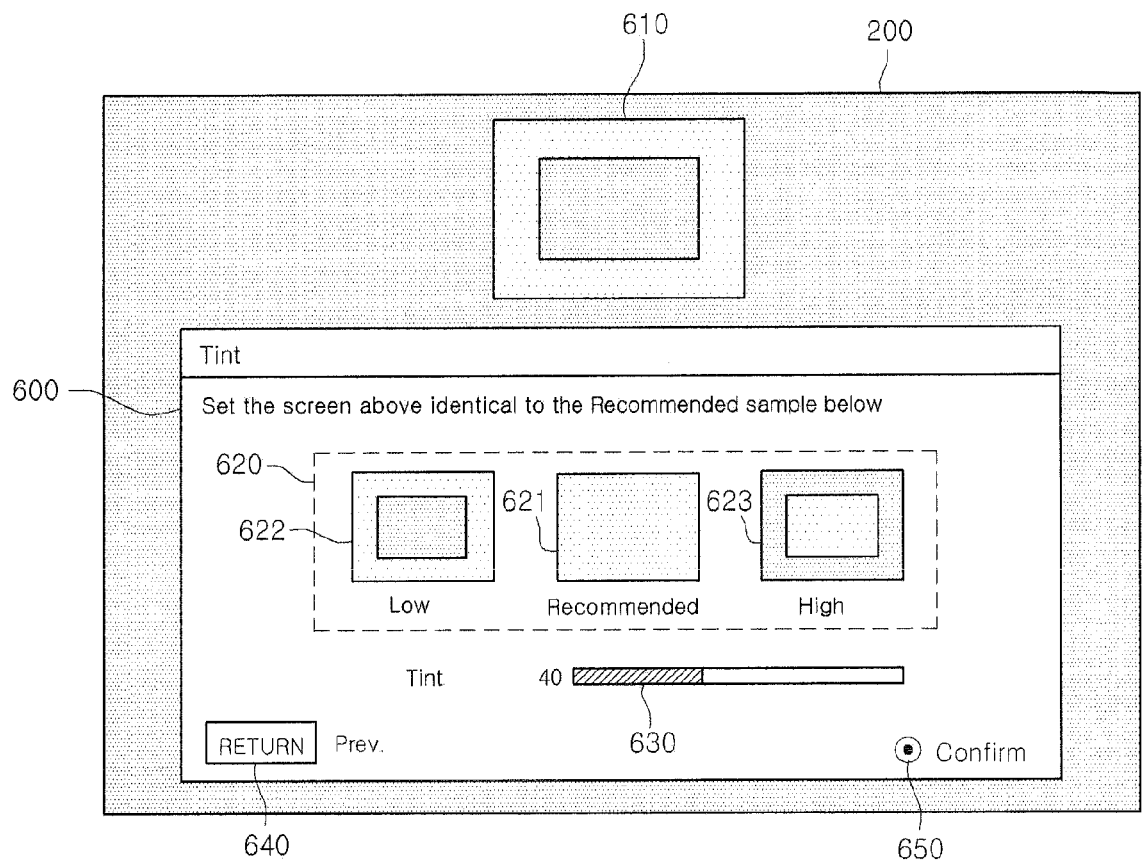
FIG. 30 is a diagram illustrating a tint control method of an image display device according to an embodiment.

FIG. 30 is a view illustrating a tint control method of an image display device according to an embodiment. The overlapping description about components of FIG. 30 related to FIGS. 1 to 29 will be omitted.

Referring to FIG. 30, patterns 610 and 620 for controlling tint among a plurality of definition control items may be displayed on the display screen 200.

Figure 31:
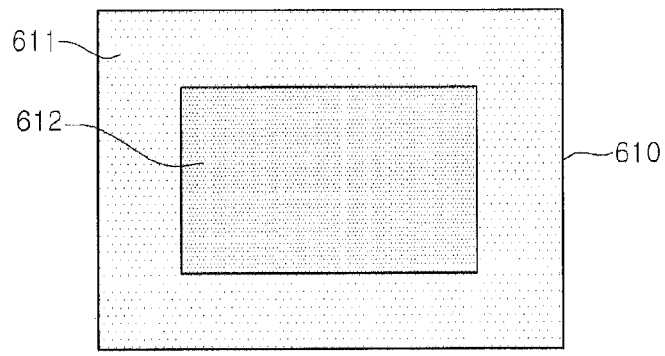
FIGS. 31 to 34 are diagrams illustrating a display status of a first pattern for tint control according to a first embodiment.

A test pattern 610 may include a plurality of regions having respectively different colors and for example, as shown in FIG. 31, may include a first region 611 and a second region 612 of respectively different colors.

In more detail, the first region 611 has one of cyan, magenta, and yellow and the second region 612 has another one of the above cyan, magenta, and yellow.

According to an embodiment, the first region 611 in the test pattern 610 may include image data corresponding to cyan color of the mixed 75% blue color and 75% red color and the second region 612 may include image data corresponding to a magenta color of the mixed 75% blue color and 75% green color.

Moreover, like the above color control, an image signal of the test pattern 610 is outputted to the display unit 170 after only a signal corresponding to blue color is extracted at the final terminal of the signal processing unit 160 and accordingly, the display unit 170 may display only blue color among the test pattern 610.

A color axis moves by controlling tint of an image and when tint is controlled in a direction, color concentration about one color is typically increased and color about another color is reduced.

Accordingly, when a tint control value inputted from a user is changed, the color to be displayed of the first region 611 may be changed and the color to be displayed of the second region 612 may be changed simultaneously.

For example, as the inputted tint control value is increased, the blue color to be displayed of the first region 611 may be decreased and the blue color to be displayed of the second region 612 may be increased. Additionally, as the inputted tin control value is decreased, the blue color to be displayed of the first region 611 may be increased and the blue color to be displayed of the second region 612 may be decreased.

Figure 32:
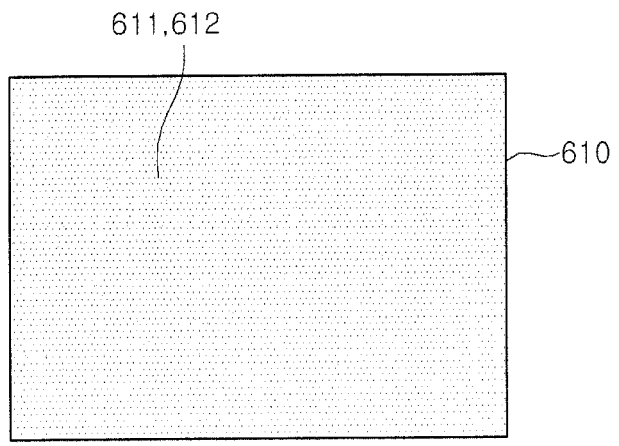

If a tine of an image is set as standard definition, as shown in FIG. 32, a color difference to be displayed between the first region 611 and the second region 612 in the test pattern 610 may not be visually recognizable to a user.

That is, by allowing the first region 611 having 75% cyan color and the second region 612 having 75% magenta color in the test pattern 610 to be recognizable as the same color, the tint of an image may be set as standard definition.

Moreover, the above configuration of the test pattern 610 is just one embodiment and accordingly, a color or form of each of the first and second regions 611 and 612 may vary.

Furthermore, a tint control menu window 600 displaying a guide pattern 620 with a plurality of images 621, 622, and 623 may be displayed on the display screen 200.

A standard image 621 (i.e., Recommended) arranged at the center of the guide pattern 620 is a criterion for setting the tint of an image as standard definition. A user may set the color concentration of standard definition by setting a control value to allow the test pattern 610 and a display status of the standard image 621, i.e., the brightness of regions in each pattern, to be visually identical.

For this, the standard image 621 is generated with tint to allow the test pattern 610 to be displayed in the above standard definition and then is stored in the memory 150. In more detail, the standard image 621 may include one region having uniform color as shown in FIG. 32.

Accordingly, when the test pattern 610 and a display status of the standard image 621 are visually identical, each of the regions 611 and 612 in the test pattern 610 has colors identical to those shown in FIG. 32. Thus, the tint of an image to be displayed may be set to be identical to standard definition, i.e., it may be set to be seen actually identical based on a corresponding user's view.

Moreover, a first sample image 622 (i.e. Low) at the left of the standard image 621 among the guide pattern 620 represents a display status of the test pattern 610 when a tint control value inputted by a user is low.

That is, as a user reduces a tint control value, a variable region 230 of a control value display OSD changes into the left direction. Accordingly, a display status of the test pattern 610 may be gradually changed to be identical to the first sample image 622 (i.e., Low).

As shown in FIG. 30, the first sample image 622 (i.e. Low) includes two regions having respectively different colors. In more detail, it may include a first region and a second region that is disposed in the first region and has low blue color than the first region.

That is, if the tint control value is very low, the blue color to be displayed of the first region 611 in the test pattern 610 is increased and the blue color to be displayed of the second region 612 is decreased. Thus, the first and second regions 611 and 612 are displayed with respectively different colors like the first sample image 621 (i.e., Low). In this case, in more detail, like the first sample image 621 (i.e., Low), the second region 612 in the test pattern 610 may be displayed with a lower blue color than the first region 611.

The second sample image 622 (i.e., High) at the right of the standard image 621 in the guide pattern 620 represents a display status of the test pattern 610 when a tint control value inputted by a user is high.

That is, as a user increases a tint control value, a variable region 230 of a control value display OSD changes into the right direction. Accordingly, a display status of the test pattern 610 may be gradually changed to be identical to the second sample image 622 (i.e., High).

As shown in FIG. 30, the second sample image 622 (i.e., High) includes two regions having respectively different colors. In more detail, it may include a first region and a second region that is disposed in the first region and has low blue color than the first region.

That is, if the tint control value is very high, the blue color to be displayed of the first region 611 in the test pattern 610 is decreased and the blue color to be displayed of the second region 612 is increased. Thus, like the second sample image 622 (i.e., High), the first and second regions 611 and 612 are displayed with respectively different colors and thus may be visually recognizable to a user. In this case, in more detail, like the second sample image 622 (i.e., High), the second region 612 in the test pattern 610 may be displayed with a higher blue color than the first region 611.

A user selects the "☉" button 650 when the test pattern 610 and a display status of the standard image 621, i.e., brightness of each region, are visually identical and thus, may set a tint level with a control value at the identical point.

Furthermore, the test pattern 610 described with reference to FIGS. 30 to 32 is just one embodiment, so that the form, size, region count, and each region's brightness of the test pattern 610 may vary.

Figure 33:
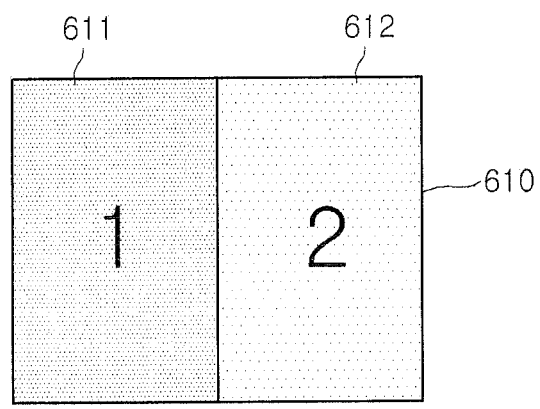

Referring to FIG. 33, the test pattern 610 includes first and second regions 611 and 612 displayed adjacent to the left and the right and the first and second regions 611 and 612 has 75% cyan color and 75% magenta color, respectively.

Figure 34:
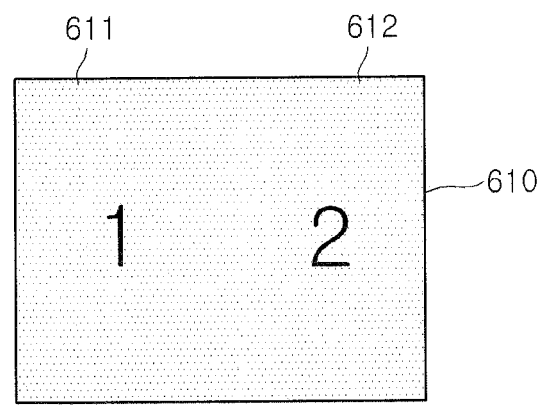

Moreover, when a control value is set to allow a display status of the test pattern 610 as shown in FIG. 33 to be identical to FIG. 34, the tint of an image may be set as standard definition.

That is, as shown in FIG. 34, a tint control value may be changed and set so that the color difference of the first and second regions 611 and 612 in the test pattern 610 is not visually recognizable to a user.

In this case, the standard image 621 in the guide pattern 620 may have the same form and color as those in FIG. 34.

Figure 35:
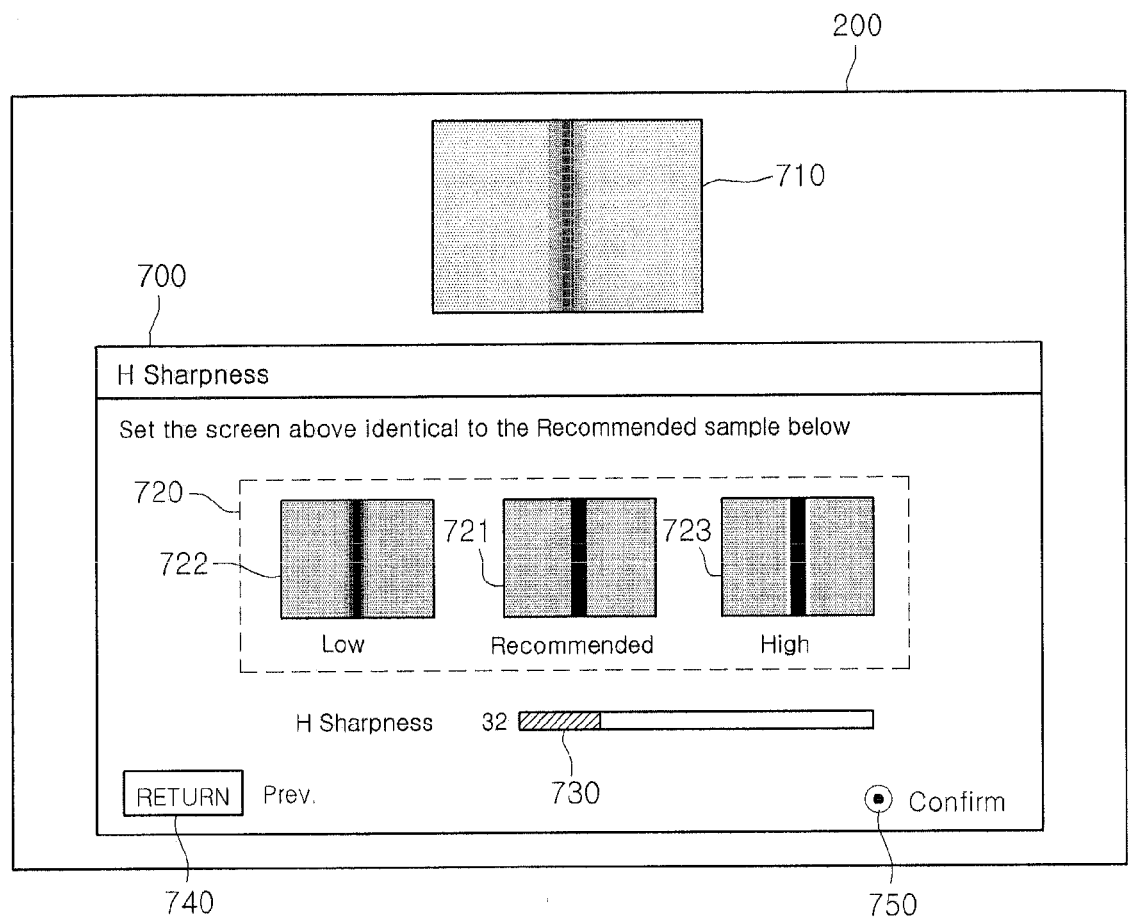
FIG. 35 is a diagram illustrating a vertical sharpness control method of an image display device according to an embodiment.
Figure 36:
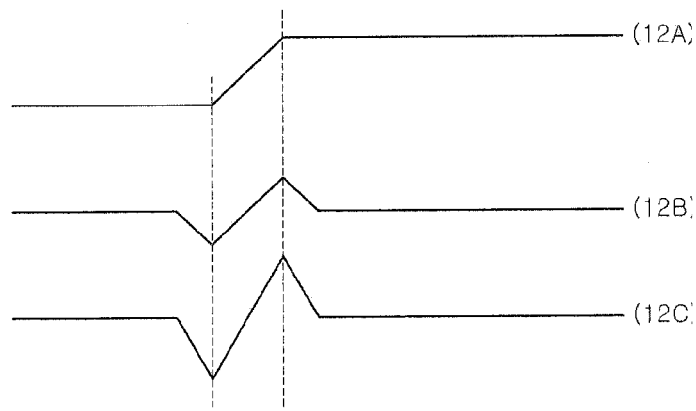
FIG. 36 is a diagram illustrating a sharpness change of a screen according to a control value.
Figure 37:
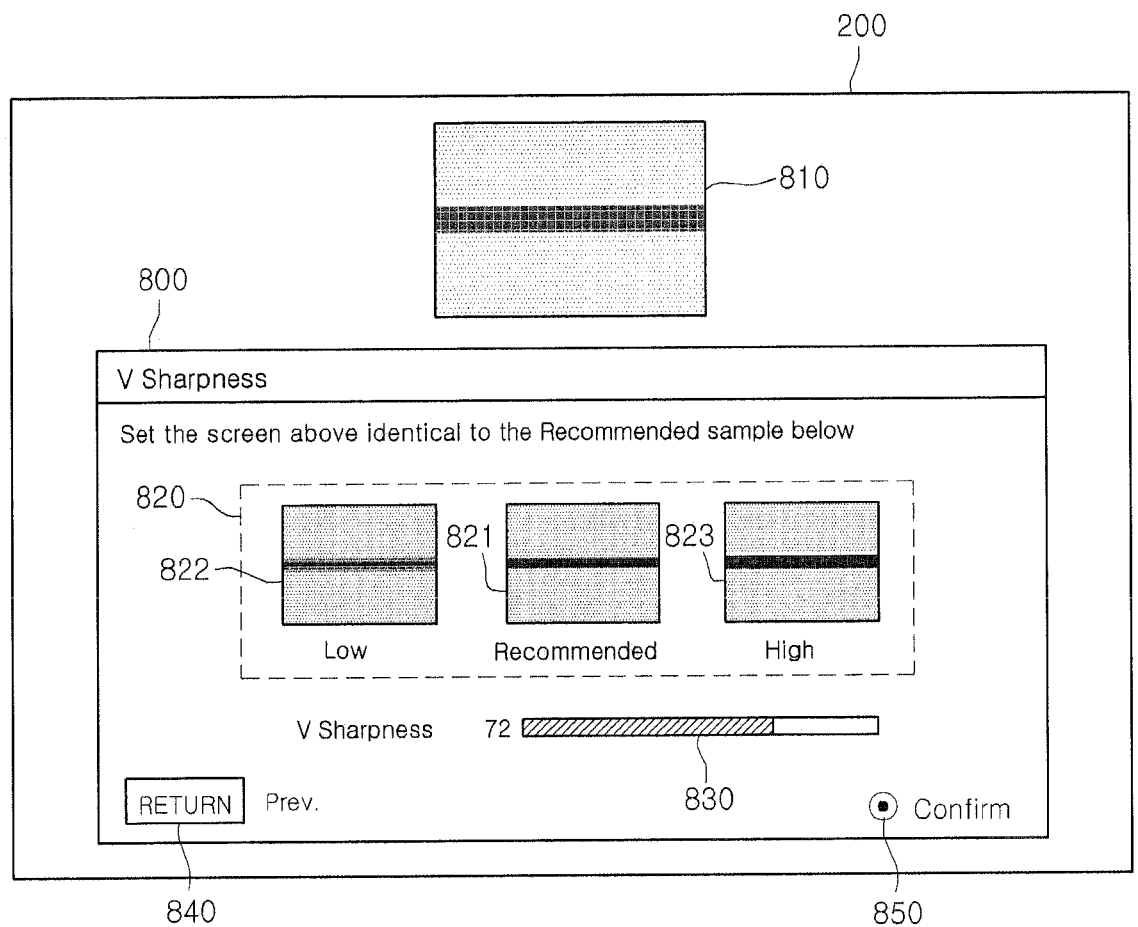
FIG. 37 is a diagram illustrating a horizontal sharpness control method of an image display device according to an embodiment.

FIGS. 35 to 37 are views illustrating a sharpness control method of an image display device according to an embodiment. The overlapping description about components of FIGS. 35 to 37 related to FIGS. 1 to 34 will be omitted.

Referring to FIG. 35, patterns 710 and 720 for controlling horizontal sharpness may be displayed on the display screen 200. Moreover, each of the test pattern 710 and a plurality of images 721, 722, and 723 in the guide pattern 720 may include at last one line extending in a vertical direction.

According to an embodiment, a control value, i.e. a horizontal sharpness value, may be set to allow a display status of the vertical line displayed on the test pattern 710 and a display status of the vertical line displayed as the standard image 721 in the guide pattern 720 to be identical.

Referring to FIG. 36, in order to improve the sharpness of an image, sharpness around a region having a high frequency component such as an edge or texture of an original signal may be improved. As a method for this, after an original signal passes through a high pass filter, a signal having a form 12B of FIG. 36 comes out and then filtering error may be removed by applying methods such as 'Coring' or 'Thresholding' to the signal.

Moreover, after multiplying a high frequency component by a weight value, its result is added to the original signal and finally, a signal having improved sharpness as shown in 12B of FIG. 36 may be obtained.

That is, artificial overshoot or undershoot occurs in the original signal and due to this, a transition width is reduced and sharpness is increased. As a weight value is increased, a high frequency component is amplified greatly, so that sharpness is more increased.

However, if a weight value is set highly, sharpness is improved but peaking occurs on a screen, so that an irritating image with noise may be recognized to a user.

According to an embodiment, when a sharpness control value inputted from a user is changed, a weight value multiplied to a high frequency band of the image signal is changed. Thus, the sharpness of a line displayed on the test pattern 710 may be changed.

For example, as the inputted horizontal sharpness control value is increased, the weight value is increased so that the sharpness of the vertical line displayed on the test pattern 710 may be increased. Additionally, as the inputted horizontal sharpness control value is decreased, the weight value is decreased so that the sharpness of the vertical line displayed on the test pattern 710 may be decreased.

If the horizontal sharpness of an image is set as standard definition, a vertical line displayed on the test pattern 710 may be sharply displayed with one line having a uniform brightness.

Moreover, the above configuration of the test pattern 710 is just one embodiment and accordingly, color concentration, brightness, or count of a vertical line in the test pattern 710 may vary.

Moreover, a horizontal sharpness control menu window 700 displaying a guide pattern 720 with a plurality of images 721, 722, and 723 may be displayed on the display screen 200.

A standard image 721 (i.e., Recommended) arranged at the center of the guide pattern 720 is a criterion for setting the horizontal sharpness of an image as standard definition. A user may set the horizontal sharpness of standard definition by setting a control value to allow the test pattern 710 and a display status of the standard image 721, i.e., the brightness and form of a vertical line in each pattern, to be visually identical.

For this, the standard image 721 is generated with sharpness to allow the test pattern 710 to be displayed in the above standard definition and then is stored in the memory 150. In more detail, the standard image 721 may include one vertical line having uniform brightness as shown in FIG. 35.

Accordingly, when the test pattern 710 and a display status of the standard image 721 are visually identical, the vertical line displayed on the test pattern 710 may be displayed with one line having uniform brightness. Thus, the horizontal sharpness of an image to be displayed may be set to be identical to standard definition, i.e., it may be set to be seen actually identical based on a corresponding user's view.

Moreover, a first sample image 722 (i.e. Low) at the left of the standard image 721 among the guide pattern 720 represents a display status of the test pattern 710 when a horizontal sharpness control value inputted by a user is low.

That is, as a user reduces a horizontal sharpness control value, a variable region 230 of a control value display OSD changes into the left direction. Accordingly, a display status of the test pattern 710 may be gradually changed to be identical to the first sample image 722 (i.e., Low).

As shown in FIG. 35, the first sample image 722 (i.e., Low) may include a vertical line where a boundary between the line and its perimeter is uncertain and thus the brightness of the boundary portion has a value of more than 2.

That is, if a horizontal sharpness control value is very low, the horizontal sharpness of a vertical line displayed on the test pattern 710 is reduced, so that a boundary between the vertical line and its perimeter may be displayed uncertainly.

A second sample image 722 (i.e. High) at the right of the standard image 721 among the guide pattern 720 represents a display status of the test pattern 710 when a horizontal sharpness control value inputted by a user is high.

That is, as a user increases a horizontal sharpness control value, a variable region 230 of a control value display OSD changes into the right direction. Accordingly, a display status of the test pattern 710 may be gradually changed to be identical to the second sample image 722 (i.e., High).

As shown in FIG. 35, the second sample image 722 (i.e., High) may include a plurality of vertical lines having respectively different brightness.

That is, if a horizontal sharpness control value is very high, peaking may occur around a vertical line of the test pattern 710 and thus, a line having a higher brightness then the vertical line is displayed around the vertical line, so that a plurality of vertical lines having respectively different brightness may be displayed to a user.

In more detail, if a horizontal sharpness control value is very high, like a display status of the second sample image 722 (i.e., High), the test pattern 710 has vertical lines (each has white color at the left and the right), so that a plurality of vertical lines having respectively different brightness may be visually recognizable to a user.

When the test pattern 710 and a display status of the standard image 721, i.e., the brightness and form of the vertical line, are visually identical, a user selects the "⊙" button 750 to set a horizontal sharpness level with a control value at the identical point.

Referring to FIG. 37, patterns 810 and 820 for controlling vertical sharpness may be displayed on the display screen 200. Moreover, each of the test pattern 810 and a plurality of images 821, 822, and 823 in the guide pattern 820 may include at least one line extending in a horizontal direction.

According to an embodiment, a control value, i.e., a vertical sharpness value may be set to allow a display status of a horizontal line displayed on the test pattern 810 and a display status of a horizontal line displayed as the standard image 821 in the guide pattern 820 to be identical.

For example, as the inputted vertical sharpness control value is increased, as mentioned above, a weight value is increased so that the sharpness of a horizontal line displayed on the test pattern 810 may be increased. Also, as the inputted vertical sharpness control value is decreased, a weight value is decreased so that the sharpness of a horizontal line displayed on the test pattern 810 may be decreased.

When the vertical sharpness of an image is set as standard definition, the horizontal line displayed on the test pattern 810 may be clearly displayed with one line having uniform brightness.

Furthermore, the above configuration of the test pattern 810 is just one embodiment and thus, the color, brightness, or count of a horizontal line in the test pattern 810 may vary.

Moreover, a vertical sharpness control menu window 800 displaying the guide pattern with a plurality of images 821, 822, and 823 may be displayed on the display screen 200.

A standard image 821 (i.e., Recommended) arranged at the center of the guide pattern 820 is a criterion for setting the vertical sharpness of an image as standard definition. A user may set the vertical sharpness of standard definition by setting a control value to allow the test pattern 810 and a display status of the standard image 821, i.e., the brightness and form of a horizontal line in each pattern, to be visually identical.

For this, the standard image 821 is generated with sharpness to allow the test pattern 810 to be displayed in the above standard definition and then is stored in the memory 150. In more detail, the standard image 821 may include one horizontal line having uniform brightness as shown in FIG. 37.

Accordingly, when the test pattern 810 and a display status of the standard image 821 are visually identical, the horizontal line displayed on the test pattern 810 may be displayed with one line having uniform brightness. Thus, the vertical sharpness of an image to be displayed may be set to be identical to standard definition, i.e., it may be set to be seen actually identical based on a corresponding user's view.

Moreover, a first sample image 822 (i.e. Low) at the left of the standard image 821 among the guide pattern 820 represents a display status of the test pattern 810 when a vertical sharpness control value inputted by a user is low.

That is, as a user reduces a vertical sharpness control value, a variable region 230 of a control value display OSD changes into the left direction. Accordingly, a display status of the test pattern 810 may be gradually changed to be identical to the first sample image 822 (i.e., Low).

As shown in FIG. 37, the first sample image 822 (i.e., Low) may include a horizontal line where a boundary between the line and its perimeter is uncertain and thus the brightness of the boundary portion has a value of more than 2.

That is, if a vertical sharpness control value is very low, the vertical sharpness of a horizontal line displayed on the test pattern 810 is reduced, so that a boundary between the horizontal line and its perimeter may be displayed uncertainly.

A second sample image 822 (i.e. High) at the right of the standard image 821 among the guide pattern 820 represents a display status of the test pattern 810 when a vertical sharpness control value inputted by a user is high.

That is, as a user increases a vertical sharpness control value, a variable region 230 of a control value display OSD changes into the right direction. Accordingly, a display status of the test pattern 810 may be gradually changed to be identical to the second sample image 822 (i.e., High).

As shown in FIG. 37, the second sample image 822 (i.e., High) may include a plurality of horizontal lines having respectively different brightness.

That is, if a vertical sharpness control value is very high, peaking may occur around a horizontal line of the test pattern 810 and thus, a line having a higher brightness than the horizontal line is displayed around the horizontal line, so that a plurality of horizontal lines having respectively different brightness may be displayed to a user.

In more detail, if a vertical sharpness control value is very high, like a display status of the second sample image 822 (i.e., High), the test pattern 810 has horizontal lines (each has white color at the left and the right), so that a plurality of vertical lines having respectively different brightness may be visually recognizable to a user.

When the test pattern 810 and a display status of the standard image 821, i.e., the brightness and form of the horizontal line, are visually identical, a user selects the "☉" button 850 to set a vertical sharpness level with a control value at the identical point.

In FIGS. 13 to 37, although the main image 240 is not displayed on the display screen 200 as described with reference to FIGS. 10 to 12, the main image 240 may be displayed in FIGS. 13 to 37.

In this case, as mentioned above, the main image displayed on the display screen 200 and the test pattern may be simultaneously changed as a control value is changed.

Figure 38:
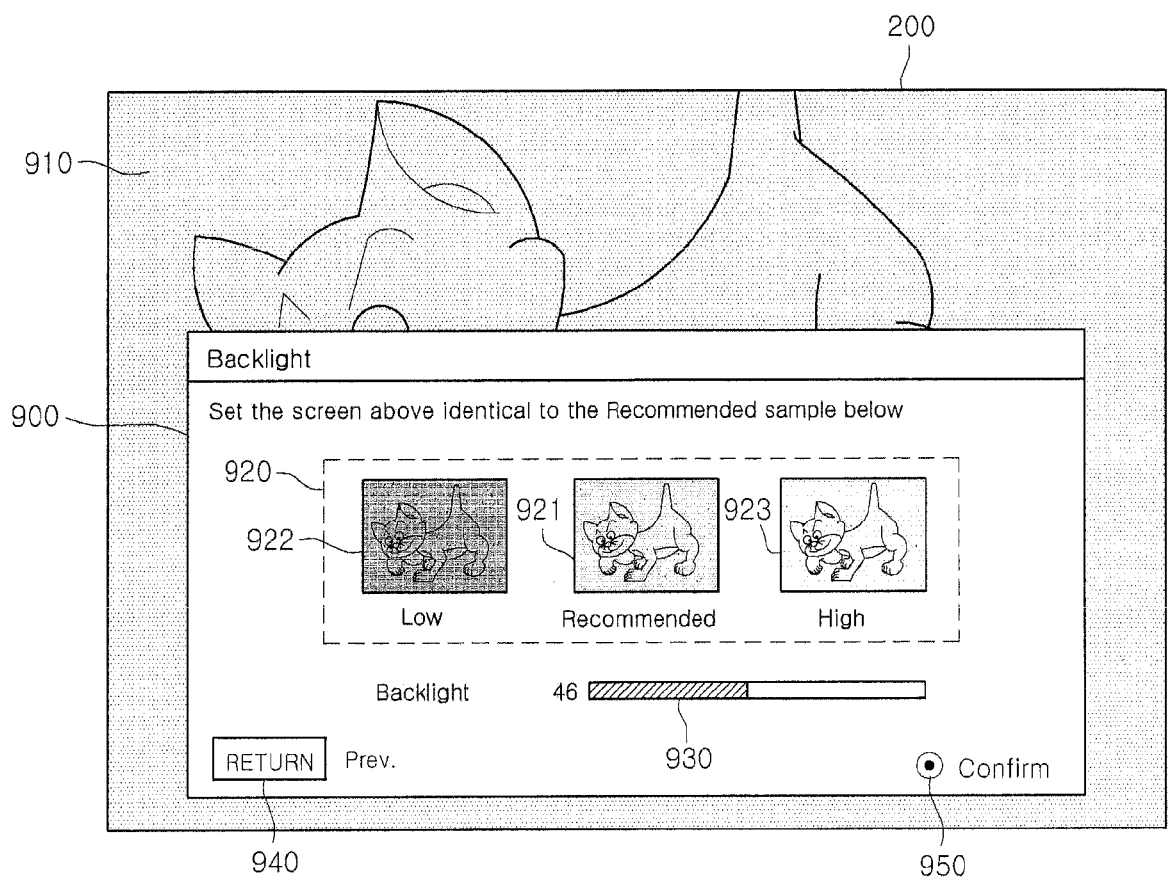
FIG. 38 is a diagram illustrating a backlight brightness control method of an image display device according to an embodiment.

FIG. 38 is a view illustrating a backlight brightness control method of an image display device according to an embodiment. The overlapping description about components of FIG. 38 related to FIGS. 1 to 37 will be omitted.

For example, a liquid crystal panel of an LCD includes a liquid crystal layer and a TFT substrate and a color filter substrate facing each other with the liquid crystal layer interposed therebetween. Since the liquid crystal panel is not self-luminous, an image may be displayed using light provided from a backlight unit.

Referring to FIG. 38, patterns 910 and 920 for controlling brightness of the backlight may be displayed on the display screen 200.

As shown in FIG. 38, the test pattern 910 may be displayed as a background screen in an entire region of the display screen 200 and as a backlight control value inputted from a user is changed, the brightness of the test pattern 910 may be changed.

For example, as the inputted backlight control value is increased, the brightness of the displayed test pattern 910 is increased and as the inputted backlight control value is decreased, the brightness of the displayed test pattern 910 is decreased.

Moreover, a backlight control menu window 900 displaying a guide pattern 920 with a plurality of images 921, 922, and 923 may be displayed on the display screen 200.

A standard image 921 (i.e., Recommended) arranged at the center of the guide pattern 920 is a criterion for setting the brightness of the backlight as standard definition. A user may set standard definition by setting a control value to allow the test pattern 910 and a display status of the standard image 921, i.e., the total brightness, to be visually identical.

For this, the standard image 921 is generated with brightness to allow the test pattern 910 to be displayed in the above standard definition and then is stored in the memory 150.

Thus, when the test pattern 910 and the standard image 921 have visually matching display states, the brightness of the backlight may be set to correspond to the standard definition, in actuality, to correspond thereto in terms of the user's vision.

Meanwhile, a first sample image (Low) 922 of the guide patterns 920, positioned to the left of the standard image 921, represents the display state of the test pattern 910 when a backlight control value input by the user has a relatively low value.

That is, as the user reduces the backlight control value, the variable region 930 of the control value display OSD changes to the left, thus gradually changing the display state of the test pattern 910 to be equal to that of the first sample image (Low) 922.

As shown in FIG. 38, the first sample image (Low) 922 may have a lower level of screen brightness than that of the standard image 921.

That is, when the backlight control value is significantly lowered, the overall brightness of the test pattern 910 being displayed may become darker to be equal to the overall brightness of the first sample image (Low) 921.

A second sample image (High) 922 of the guide patterns 920, positioned to the right side of the standard image 921, represents the display state of the test pattern 910 when the backlight control value input by the user has a relatively high value.

That is, as the user increases the backlight control value, the variable region 930 of the control value display OSD changes to the left, thus gradually changing the display state of the test pattern 910 to be equal to that of the second sample image (High) 922.

As shown in FIG. 38, the second sample image (High) 922 may have a higher level of screen brightness than that of the standard image 921.

That is, when the backlight control value is significantly increased, the overall brightness of the test pattern 910 being displayed may become brighter to be equal to the overall brightness of the second sample image (High) 922.

When the test pattern 910 and the standard image 921 have matching display states, namely, visually matching overall brightness, the user may select a "☐" button 950, thus setting the backlight brightness level to a control value at the time of the matching.

According to another embodiment, the backlight unit provided in the image display device may be driven by a full driving scheme or a local driving scheme such as local dimming, impulsive driving or the like. The driving scheme of the backlight unit may be variously varied according to a circuit design, and is not particularly limited. Accordingly, this embodiment is contributive to increasing color contrast and clearly expressing darker or brighter portions of an image on the screen, thus improving the definition.

That is, the backlight unit is divided into a plurality of local driving regions to be driven. The luminance levels of the local driving regions are individually linked to the luminance of a video signal so that luminance for dark part of an image is decreased while luminance for bright part of the image is increased, thus enhancing contrast and sharpness.

In this case, the backlight brightness control method as described above with reference to FIG. 38 may be applied to each of the plurality of local driving regions of the backlight unit. Accordingly, brightness can be individually controlled in each of the plurality of local driving regions.

Meanwhile, definition control upon the plurality of definition items, as described above with reference to FIGS. 13 through 38, may be performed sequentially in preset order. Here, the plurality of definition items may include brightness, contrast, color concentration, tint, sharpness, and backlight brightness.

For example, when the user selects a definition control menu of the image display device, the brightness control as described with reference to FIG. 13 through 18 may be performed first, and then the contrast control as described with reference to FIGS. 19 through 24 may be performed.

That is, as described with reference to FIG. 16, the brightness control is associated with controlling the y intercept of a linear curve representing a brightness level of an image, namely, a DC value, while the contrast control, as described with reference to FIG. 22, is associated with controlling the slope of the linear curve representing the brightness level of the image, namely, gain.

Accordingly, when the contrast control is carried out, if the y intercept of the linear curve has been erroneously set, the brightness, namely, the y intercept of the linear curve needs to be controlled again. In this regard, the y intercept of the linear curve may be set first for the brightness control, and the slope of the linear curve is then controlled for the contrast control, thereby minimizing the repetition of control Meanwhile, after the contrast control is completed in the above manner, the color concentration control as described above with reference to FIGS. 25 through 29 and the tint control as described above with reference to FIGS. 30 through 34 may then be performed.

That is, the process of accurately setting luminance by performing the brightness control and the contrast control needs to precede the color concentration control and the tint control, thereby accurately setting the color.

This is because the color is controlled on the basis of luminance. That is, if luminance serving as a criterion is erroneously set, the color controlled on the basis of the luminance, namely, the color concentration and the tint, may also be erroneously set.

Furthermore, as described above, after the brightness control, the contrast control, the color concentration control and the tint control are completed, the sharpness control, particularly, the horizontal sharpness control and the vertical sharpness control as described with reference to FIGS. 35 through 37 may be performed.

Since the sharpness control is divided into luminance control and color control, the sharpness may be controlled after the luminance and the color level are set.

However, considering that human vision is sensitive to luminance while being less sensitive to color changes, the sharpness control may be performed after the brightness control and the contrast control. Even in the case of the sharpness control as described with reference to FIGS. 35 through 37, the sharpness is controlled by displaying patterns having luminance components only.

After the brightness control, the contrast control, the color concentration control, the tint control, and the sharpness control are completed in the above manner, the backlight brightness control as described with reference to FIG. 38 may be performed.

This is because, if the backlight brightness control precedes the control upon other definition items, for example, if the user sets the brightness of the backlight at a low level, it is difficult to discriminate brightness or color in the following bright, contrast, color concentration, tint and sharpness control, thus making it difficult for the user to visually discriminate differences in brightness and color in a pattern being displayed or between regions of the pattern.

Furthermore, as shown in FIG. 38, the test pattern 910 for the backlight brightness control may be displayed in size corresponding to the entire region of the screen. Since the backlight brightness control is performed as the final process of the definition control, the final result of controlling the plurality of definition control items may be confirmed on the entirety of the screen.

Figure 39:
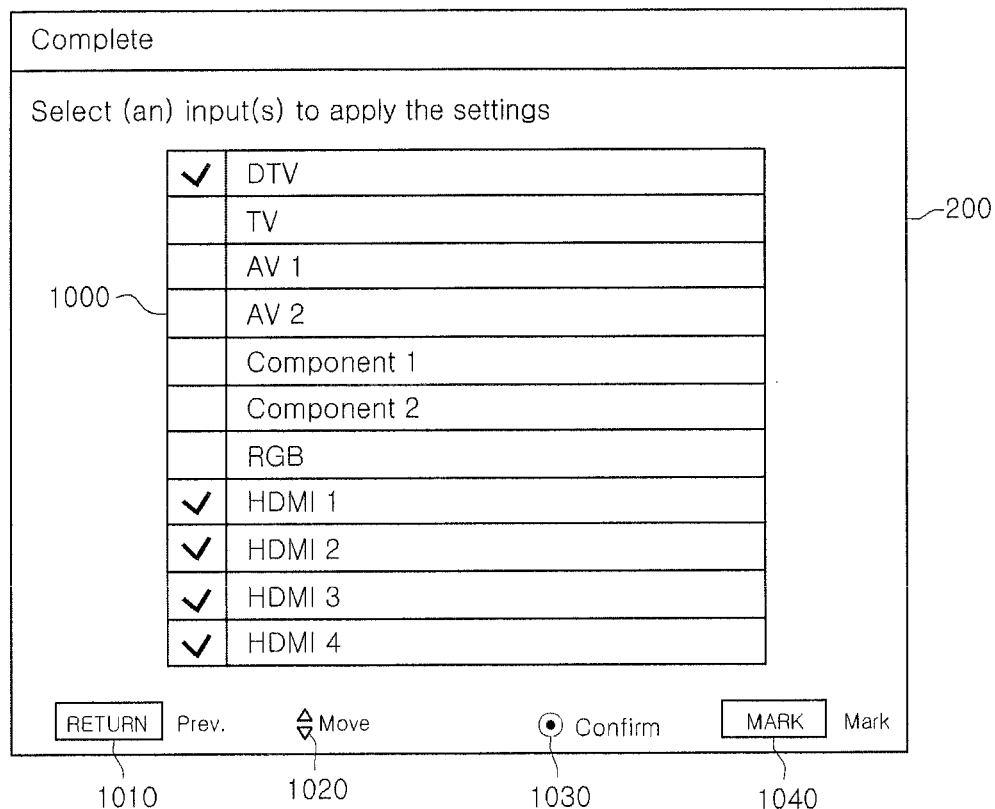
FIG. 39 is a diagram illustrating an embodiment of a user interface which allows a user to select an external input for applying a set control value.

FIG. 39 is a view illustrating a user interface for receiving an external input from a user according to an embodiment. FIG. 39 illustrates a display screen for receiving an external input to which a control value, set by a screen control method according to an embodiment, is to be applied.

Referring to FIG. 39, the definition control as described above, for example, control upon a plurality of definition items, is all completed, an external input selection window 1000 for the selection of an external input to which settings obtained by the completed definition control are to be applied may be displayed on the display screen.

The user may select at least one from among a plurality of external inputs displayed on the external input selection window 1000, thus selecting an external input to which settings determined by the preceding definition control are to be applied.

For example, the user may use a direction key 1020 and a "MARK" button 1040 to select at least one external input to which the settings are to be applied, from among the plurality of external inputs displayed on the external input selection window 1000. After the external input is selected, the settings may be applied to the selected external input by pressing a "□" button 1030.

Meanwhile, a "RETURN" button may be used to reenter the previously performed definition control so that the definition control can be performed again upon an item to be re-controlled among the plurality of definition items.

Furthermore, one or more of the plurality of external inputs displayed on the external input selection window 1000 may be selected in advance as those to which the settings are to be applied.

For example, "DTV" or "HDMI" external inputs providing high-definition images may be selected in advance as external inputs to which control values set as a standard definition in the aforementioned manner are to be applied. In addition, an external input which previously provided a video signal before the definition control may be selected in advance as an external input to which the settings are to be applied.

In the case where the user does not want to apply the settings to an external input selected in advance, the user may select the corresponding external input using the direction key 1020, and then release the selection of the external input by using the "MARK" button 1040.

The definition control method and a pattern display method for the same according to the above-described embodiments may be manufactured as programs executable in computers and be stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to embodiments, a user controls definition according to a state where the plurality of patterns are displayed on a screen, and thus the definition of an image visually viewed by the user may be set as the standard definition.

Moreover, even when the user has manipulated several menus to change definition, the standard definition may be set through the proposed definition set operation that are performed in several stages, and thus there is efficiency in terms of the user interface of the user.

Accordingly, an operation where an expert receives standard-definition video data from the external device to check whether standard definition has been set or an operation where the expert checks a color and a tint with the filter for a specific color are not required, and thus embodiments may be usefully applied to various aspects.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A definition control method of an image display device, the method comprising:
   displaying a first pattern and a second pattern;
   inputting a control value; and
   changing a display state of the first pattern according to the input control value,
   wherein the first pattern includes a plurality of regions having different levels of brightness,
   wherein, in brightness control, the first pattern includes a first region having a level of brightness greater than 0 IRE, a second region having a level of brightness equal to 0 IRE and a third region having a level of brightness less than 0 IRE, and
   wherein a display state of the second pattern is not changed by the control value.

2. The method according to claim 1, further comprising displaying a video signal,
   wherein a display state of the video signal and the display state of the first pattern are changed simultaneously according to a change in the control value.

3. The method according to claim 1, wherein the first pattern and the second pattern are stored in the image display device.

4. The method according to claim 1, wherein the first pattern and the second pattern are subjected to different image processing processes and then displayed.

5. The method according to claim 1, wherein the display states include brightness, contrast, color concentration, tint, sharpness or backlight brightness of the first and second patterns displayed on a screen.

6. The method according to claim 1, wherein the second pattern includes a plurality of images different from one another.

7. The method according to claim 6, wherein the plurality of images include a standard image and at least one sample image.

8. The method according to claim 6, wherein, when the input control value has a prescribed value, the first pattern and a standard image of the second pattern have visually matching display states on a screen.

9. The method according to claim 8, further comprising setting the control value at the first value.

10. The method according to claim 6, wherein, when the input control value has a prescribed value, the first pattern and a sample image of the second pattern have visually matching display states on a screen.

11. The method according to claim 1, wherein definition control is performed sequentially with respect to a plurality of definition items.

12. The method according to claim 11, wherein the definition control is performed in the order of brightness and contrast among the plurality of definition items.

13. The method according to claim 11, wherein the definition control is performed in the order of brightness, contrast, color concentration, and tint among the plurality of definition items.

14. The method according to claim 11, wherein the definition control is performed in the order of brightness, contrast, color concentration, tint, sharpness, and backlight brightness among the plurality of definition items.

15. The method according to claim 11, wherein the first pattern displayed in the definition control is different with respect to each of the plurality of definition items.

16. The method according to claim 15, wherein at least one of brightness, contrast, color concentration, tint, sharpness, backlight brightness, shape or size of the first pattern displayed in the definition control is different with respect to each of the plurality of definition items.

17. The method according to claim 15, wherein the plurality of definition items include a first item and a second item, and
   the first pattern displayed in the definition control of the first item is different from the first pattern displayed in the definition control of the second item in terms of a definition state corresponding to the first item.

18. The method according to claim 15, wherein the plurality of definition items include a first item, a second item, and a third item, and the first pattern displayed in the definition control of the first item is equal to the first pattern displayed in the definition control of the second item in terms of a definition state corresponding to the third item.

19. The method according to claim 11, wherein the second pattern displayed in the definition control is different with respect to each of the plurality of definition items.

20. The method according to claim 19, wherein at least one of brightness, contrast, color concentration, tint, sharpness or backlight brightness of the second pattern displayed in the definition control is different with respect to each of the plurality of definition items.

21. The method according to claim 11, wherein, in the definition control of a first item among the plurality of definition items, the display state of the first pattern is changed in only a definition state corresponding to the first item.

22. The method according to claim 11, wherein, in the definition control of a first item among the plurality of definition items, control values corresponding to the plurality of definition items, other than the first item, are not changed.

23. The method according to claim 1, further comprising setting a control value after the displaying of the first and second patterns.

24. The method according to claim 23, wherein the set control value is a control value input when the display states of the first and second patterns virtually match each other.

25. The method according to claim 23, further comprising selecting an external input to which the set control value is to be applied.

26. The method according to claim 1, wherein the control value is set according to whether or not at least two of the plurality of regions included in the first pattern have virtually matching levels of brightness.

27. The method according to claim 1, wherein the second pattern includes a standard image having an n number of regions having different levels of brightness.

28. The method according to claim 27, further comprising, when the n number of regions among the plurality of regions included in the first patterns are displayed to have different levels of brightness, setting a control value input at a corresponding point of time.

29. The method according to claim 27, wherein the second pattern includes at least one sample image, the sample image being configured as a single region having a uniform level of brightness, or as an m number of regions having different levels of brightness, where the m is a natural number different from the n.

30. The method according to claim 1, further comprising setting a control value input when the levels of brightness of the second and third regions visually match each other.

31. The method according to claim 1, wherein, in contrast control, the first region having a level of brightness smaller than 100 IRE, the second region having a level of brightness equal to 100 IRE, and the third region having a level of brightness greater than 100 IRE.

32. The method according to claim 31, further comprising a setting a control value input when the levels of brightness of the second and third regions match each other.

33. The method according to claim 1, wherein the first pattern includes a plurality of regions having different colors.

34. The method according to claim 33, wherein the control value is set according to whether or not at least two of the plurality of regions included in the first pattern having visually matching colors.

35. The method according to claim 33, wherein the second pattern includes a standard image having a uniform color, and at least one sample image including a plurality of regions with different colors.

36. The method according to claim 33, wherein among the plurality of regions of the first pattern having different colors, a first region being displayed is not changed in color by the input control value, and a second region being displayed is changed in color according to the input control value.

37. The method according to claim 33, wherein the first pattern is displayed in only a first color among red, green and blue.

38. The method according to claim 37, wherein a color of a first region among the plurality of regions having different colors is white, and a color of a second region thereof includes the first color only.

39. The method according to claim 38, wherein the color of the first region among the plurality of regions having different colors and the color of the second region among the plurality of regions having different colors are equal to each other in terms of color concentration of the first color.

40. The method according to claim 37, wherein a color of a first region among the plurality of regions having different colors includes only a first color and a second color among red, green and blue, and a color of a second region among the plurality of regions having different colors includes the first color and a third color.

41. The method according to claim 40, wherein the color of each of the first and second regions among the plurality of regions having different colors is cyan or magenta having the same color concentration.

42. The method according to claim 37, wherein the first color is blue.

43. The method according to claim 1, wherein the first pattern includes a horizontal or vertical line.

44. The method according to claim 43, wherein the control value is set by a user according to whether or not the line is clearly displayed.

45. The method according to claim 43, wherein the second pattern includes a standard image displayed as a single line having a uniform level of brightness.

46. The method according to claim 43, wherein a weight by which a high frequency band of a video signal is multiplied is changed according to the input control value.

47. The method according to claim 1, wherein a level of brightness of a screen in which the first pattern is displayed is changed according to the input control value.

48. The method according to claim 47, wherein the second pattern includes a standard image, and at least one sample image being different from the standard image in terms of screen brightness.

49. The method according to claim 48, further comprising setting a control value by which a brightness level of the screen in which the first pattern is displayed visually matches a brightness level of the standard image.

50. An image display device comprising:
a memory storing a first pattern and a second pattern;
a user input unit through which a user inputs a control value;
a signal processing unit performing imaging processing upon the first pattern according to the input control value; and
a display unit displaying a first pattern input from the signal processing unit, and a second pattern stored in the memory,
wherein the first pattern includes a plurality of regions having different levels of brightness, and
wherein, in brightness control, the first pattern includes a first region having a level of brightness greater than 0 IRE, a second region having a level of brightness equal to 0 IRE and a third region having a level of brightness less than 0 IRE.

51. The image display device according to claim 50, wherein the second pattern is not subjected to image processing by the signal processing unit.

52. The image display device according to claim 50, wherein the signal processing unit includes at least one of an image decoder, a definition enhancer, a color space conversion (CSC) block, and a gamma corrector.

53. The image display device according to claim 50, wherein the first pattern is compressed according to a predetermined image coding scheme and stored in the memory.

54. The image display device according to claim 50, wherein the second pattern is stored in the memory as red (R), green (G) and blue (B) video signals.

55. The image display device according to claim 50, wherein the display unit includes an image combiner combining the first and second pattern.

56. The image display device according to claim 55, wherein the second pattern is directly input to the image combiner from the memory.

57. The image display device according to claim 50, wherein a display state of the first pattern is changed according to the input control value, and a display state of the second pattern is not changed by the input control value.

58. An image display device having a control menu, comprising:

an image displayed in a first region;

a first pattern displayed in a second region, wherein the first pattern includes a plurality of areas having different levels of brightness, and wherein, in brightness control, the first pattern includes a first area having a level of brightness greater than 0 IRE, a second area having a level of brightness equal to 0 IRE and a third area having a level of brightness less than 0 IRE;

a second pattern displayed in a third region; and a control value display On Screen Display (OSD) displayed in a fourth region, wherein the control value display OSD includes a fixed region and a variable region, the variable region is variably displayed according the input control value and displays a value of a definition element by using a number, a character or an abstract degree, and the image in the first region and the first pattern in the second region are changed according to a change in the control value, wherein the input control value is set when the levels of brightness of the second and third regions visually match each other.

59. The method according to claim 58, wherein at least two of the first, second, third and fourth regions overlap each other.

* * * * *